United States Patent
Ding et al.

(10) Patent No.: US 10,264,314 B2
(45) Date of Patent: Apr. 16, 2019

(54) MULTIMEDIA CONTENT MANAGEMENT SYSTEM

(71) Applicant: VUCLIP (SINGAPORE) PTE. LTD., Singapore OT (SG)

(72) Inventors: Jian Ding, Cupertino, CA (US); Bo Shen, Fremont, CA (US)

(73) Assignee: PCCW VUCLIP (SINGAPORE) PTE. LTD., Singapore (SG)

( * ) Notice: Subject to any disclaimer, the term of this patent is extended or adjusted under 35 U.S.C. 154(b) by 5 days.

(21) Appl. No.: 15/143,325

(22) Filed: Apr. 29, 2016

(65) Prior Publication Data

US 2017/0318335 A1 Nov. 2, 2017

(51) Int. Cl.
H04N 21/435 (2011.01)
H04N 21/442 (2011.01)
H04N 21/472 (2011.01)
H04N 21/266 (2011.01)
H04N 21/84 (2011.01)

(52) U.S. Cl.
CPC ..... *H04N 21/442* (2013.01); *H04N 21/26603* (2013.01); *H04N 21/435* (2013.01); *H04N 21/472* (2013.01); *H04N 21/84* (2013.01)

(58) Field of Classification Search
CPC ................ H04N 21/26603; H04N 21/472
See application file for complete search history.

(56) References Cited

U.S. PATENT DOCUMENTS

| | | | | |
|---|---|---|---|---|
| 6,311,194 B1* | 10/2001 | Sheth | ................ | G06F 17/30595 707/E17.095 |
| 6,701,526 B1* | 3/2004 | Trovato | ............ | H04N 5/44543 348/563 |
| 6,747,706 B1* | 6/2004 | Geddes | ................. | H04H 60/07 348/441 |
| 6,850,252 B1* | 2/2005 | Hoffberg | ........... | G06K 9/00369 348/E7.061 |

(Continued)

OTHER PUBLICATIONS

World Intellectual Property Organization, Application No. PCT/US17/25634, International Search Report dated Jul. 14, 2017.

(Continued)

*Primary Examiner* — Mushfikh I Alam
(74) *Attorney, Agent, or Firm* — Wong & Rees LLP; Karl T. Rees

(57) ABSTRACT

Approaches, techniques, and mechanisms are disclosed for the collection, distribution, and/or reporting of media content. According to an embodiment, media content items from one or more content providers are ingested into a content distribution system implemented by one or more server computer devices. These items of media content may comprise a variety of constituent elements, such as one or more video data units, one or more audio data units, descriptive metadata, subtitle units, thumbnails, or other information, which may be ingested all at once, or separately over time. Items may be processed using various workflows to refine content item components and/or generate new content items. Various publishing rules may be utilized to determine when the system is ready to publish a content item and distribute (Continued)

the item to client devices. Clients may request content items from various published listings, or search for content items by metadata and/or subtitles.

24 Claims, 6 Drawing Sheets

(56) References Cited

U.S. PATENT DOCUMENTS

| | | | | |
|---|---|---|---|---|
| 7,043,532 | B1* | 5/2006 | Humpleman | H04L 12/2805 709/208 |
| 7,213,255 | B2* | 5/2007 | Markel | H04N 5/4401 348/587 |
| 7,490,095 | B2* | 2/2009 | Labadie | G06N 5/02 |
| 8,589,547 | B2* | 11/2013 | Costa-Requena | H04L 12/1818 709/226 |
| 8,832,741 | B1* | 9/2014 | Bota | H04N 21/2365 725/40 |
| 9,027,064 | B1* | 5/2015 | Opare-Abetia | H04N 21/238 725/115 |
| 9,124,926 | B2* | 9/2015 | Fujimoto | H04N 21/2343 |
| 9,183,259 | B1* | 11/2015 | Marra | G06F 17/30867 |
| 9,348,493 | B2* | 5/2016 | Zhang | G06F 3/04842 |
| 9,690,992 | B2* | 6/2017 | Takanaka | G06K 9/00751 |
| 10,032,149 | B2* | 7/2018 | Rivera | G11B 27/002 |
| 2004/0154039 | A1* | 8/2004 | Simms | H04N 7/173 725/39 |
| 2004/0193635 | A1* | 9/2004 | Hsu | G06F 9/44505 |
| 2004/0226042 | A1* | 11/2004 | Ellis | H04N 5/44543 725/43 |
| 2006/0053077 | A1* | 3/2006 | Mourad | G06F 17/3089 705/51 |
| 2006/0198208 | A1* | 9/2006 | Witchey | H04L 12/1895 365/189.05 |
| 2007/0107023 | A1* | 5/2007 | Versteeg | H04L 29/06027 725/95 |
| 2008/0134260 | A1 | 6/2008 | Glassman et al. | |
| 2009/0007198 | A1* | 1/2009 | Lavender | H04N 7/163 725/91 |
| 2009/0083396 | A1* | 3/2009 | Roos | G06F 15/16 709/219 |
| 2010/0063877 | A1* | 3/2010 | Soroca | G06F 17/30749 705/14.45 |
| 2010/0070448 | A1* | 3/2010 | Omoigui | H01L 27/1463 706/47 |
| 2010/0274848 | A1* | 10/2010 | Altmaier | H04L 67/104 709/203 |
| 2011/0099156 | A1* | 4/2011 | Libin | G06F 17/30867 707/706 |
| 2011/0258049 | A1* | 10/2011 | Ramer | G06F 17/30867 705/14.66 |
| 2012/0030209 | A1 | 2/2012 | Bause et al. | |
| 2012/0224592 | A1 | 9/2012 | Henry et al. | |
| 2013/0030909 | A1* | 1/2013 | Shih | G06Q 30/0277 705/14.48 |
| 2013/0132058 | A1* | 5/2013 | Butler | H04L 67/38 703/21 |
| 2013/0177289 | A1* | 7/2013 | Kataoka | H04N 21/44222 386/230 |
| 2013/0332838 | A1 | 12/2013 | Naggar et al. | |
| 2014/0047413 | A1* | 2/2014 | Sheive | H04L 65/403 717/110 |
| 2014/0068690 | A1* | 3/2014 | Luthra | H04N 21/23430 725/110 |
| 2014/0096162 | A1* | 4/2014 | Casey | H04N 21/233 725/61 |
| 2014/0109128 | A1* | 4/2014 | Lee | H04N 21/4345 725/25 |
| 2015/0237389 | A1* | 8/2015 | Grouf | H04N 21/26283 725/49 |
| 2016/0080793 | A1 | 3/2016 | Ruffini et al. | |

OTHER PUBLICATIONS

World Intellectual Property Organization, Application No. PCT/US17/25634, Pending Claims as of Jul. 14, 2017.

* cited by examiner

MULTIMEDIA CONTENT MANAGEMENT SYSTEM

TECHNICAL FIELD

Embodiments relate generally to content management and distribution, and, more specifically, to techniques for collecting and distributing content items having multiple components that are potentially received or generated at different times and/or from different sources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Online content distributors offer a variety of media content items to consumers, ranging anywhere from user-uploaded media clips, which anyone with an Internet connection and a suitable device may freely access, to high-quality, subscription-level television shows and movies. A content distributor may distribute media content items produced by other entities, referred to herein as content providers or content publishers. When a content provider is ready for the content distributor to distribute a media content item produced by the content provider, the content provider will typically send the media content item to the content distributor. For instance, if the content item is a video, the content provider may send a video file to the content distributor. A video file may already be properly formatted and optimally compressed for distribution by the distributor before being sent to the content distributor, or the content distributor may process the video file to generate suitably formatted video data prior to distributing the media content item.

Metadata for the media content items may facilitate various distribution processes, such as categorizing and sorting the content items. For example, content distributors may index or modify content based on metadata before it reaches the viewer. Additional associated metadata for content may be generated or retrieved after receiving the content, whether to supplement or substitute existing metadata. Certain categories of descriptive metadata corresponding with video information, such as video title, actors, release year, genre, etc., may be presented alongside content items in various content distribution interfaces, such as menus, directory listings, search interfaces, program guides, and so forth. Furthermore, certain viewer actions taken while a content item is playing may be recorded as well, which may enable the creation of tracking data and other metadata.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
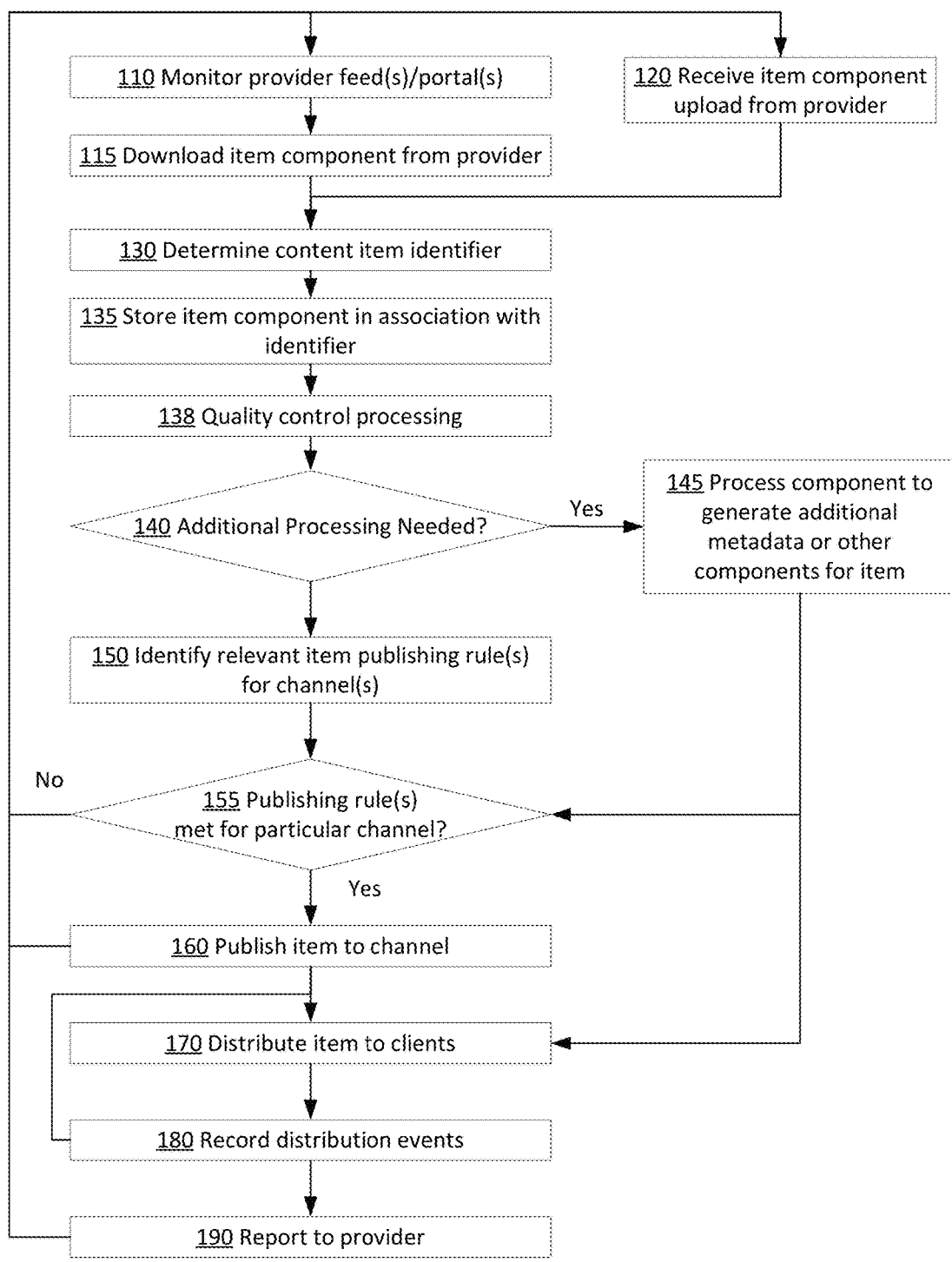
FIG. 1 illustrates an example flow 100 for processing content item components.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Content Provider
2.2. Content Ingestion
2.3. Quality Control
2.4. Content Publishing
2.5. Prioritization of Content Processing
2.6. Publishing to Multiple Channels
2.7. Rights Management
2.8. Reporting Subsystem
2.9. Content Programming
2.10. Miscellaneous
3.0. Functional Overview
3.1. General Ingestion and Distribution Flow
3.2. Prioritized Handling
4.0. Implementation Examples
4.1. Thumbnail Generation
4.2. Example Reporting Interfaces
4.3. Subtitle Indexing and Searching
5.0. Example Embodiments
6.0. Implementation Mechanism—Hardware Overview
7.0. Extensions and Alternatives

1.0. General Overview

Approaches, techniques, and mechanisms are disclosed for the collection, distribution, and/or reporting of media content. According to an embodiment, media content items from one or more content providers are ingested into a content distribution system implemented by one or more server computer devices. These items of media content may comprise a variety of constituent elements, such as one or more video data units (such as video tracks), one or more audio data units (such as audio tracks), descriptive metadata, subtitle units, thumbnails, or other information, which may be ingested all at once, or separately over time. For example, media files, subtitles, metadata, or other related assets may be acquired from content providers, who upload the content through a web portal or via an Application Programming Interface (API) hosted by the content distribution system. As another example, some or all of the foregoing may be ingested from other content distribution networks.

When received separately, the constituent elements of a media content item, also referred to as content item components or data units, are associated with each other via one or more correlation processes. A server process reads various identifiers, such as filenames or tags, associated with the content item components to identify content item components that belong to a specific content item. The content item components may be further processed utilizing other steps, such as, for instance, indexing content, or performing an automated quality check of the video and audio components, the file format, interleaved portions, and/or the relevant metadata. Other examples of processing steps may include, without limitation, checking access rights, such as geographical, platform, device, and product permissions. Various publishing rules may be utilized to determine when the system is ready to publish a content item and distribute the item to client devices. However, the receipt of content item components and processing thereof may continue even after a content item has been published. For instance, additional metadata, subtitles, audio language tracks, and video tracks may be received over time for an already-published content item, thus enhancing the viewer experience with the content item and/or allowing the content item to reach a larger audience.

For any publishing rule, various parameters may be adjusted according to viewer, distributor, and/or provider preferences. For example, quality control processing may be divided into tiers, depending on various factors, such as popularity, region of the intended viewing audience, the identity of the provider, and so forth. Simulcast or promotional videos may receive, for instance, a 'fast track' priority status, in which they would be published, and thus, processed, as soon as possible. Resources may thus be dedicated to completing the processing of such content items more quickly than for regular- or low-priority content.

A content distribution system may collect or generate additional of metadata to enhance viewers' access to and/or the experience with content items. For example, the content distributor may internally implement mechanisms for the creation of thumbnails, the addition of subtitles, summarized clips of a larger video, or recommendations for other related content.

Once content has been published, the content may be distributed to client computing devices operated by viewers using any suitable distribution mechanism. For instance, a viewer may access a web portal or application provided by the content distributor and navigate through a listing (e.g. menu or hierarchy) of content generated based on metadata associated with the content items. Or, the viewer may perform a search based on the metadata. The viewer may then request specific content items, which the content distributor sends to the viewer's device over a network such as the Internet.

In an embodiment, the distribution system described herein, or other suitable content collection systems, may be utilized to facilitate subtitle-based content searching. Text within various subtitle elements, such as captions or descriptions, may be indexed by their respective content items. The text may further be indexed at one or more levels of granularity, such as chapters or other subportions, or timestamps. A user may search for keywords in the subtitle. Based on the index, a listing of all content items whose associated subtitle(s) include the text may be returned, and the user may select to play items in the listing. In an embodiment, the listing may link to specific portion(s) or timestamp(s) within the media content item at which the text is shown. In an embodiment, the listing may include a thumbnail associated with that portion or timestamp. The user may further filter the search, in certain embodiments, by actors, genres, categories, or any other suitable metadata.

After content has been published, actions performed by viewers during, before, or after the playing of the content may be recorded in order to determine statistics about the content. For example, the most common language of the viewership may be inferred by tracking the language subtitle selected for a video. As another example, the geographical popularity of a video may be analyzed based on location data obtained from the viewer's browser or device.

In other aspects, the invention encompasses computer apparatuses and computer-readable media configured to carry out the described techniques.

2.0. Structural Overview

Figure 2:
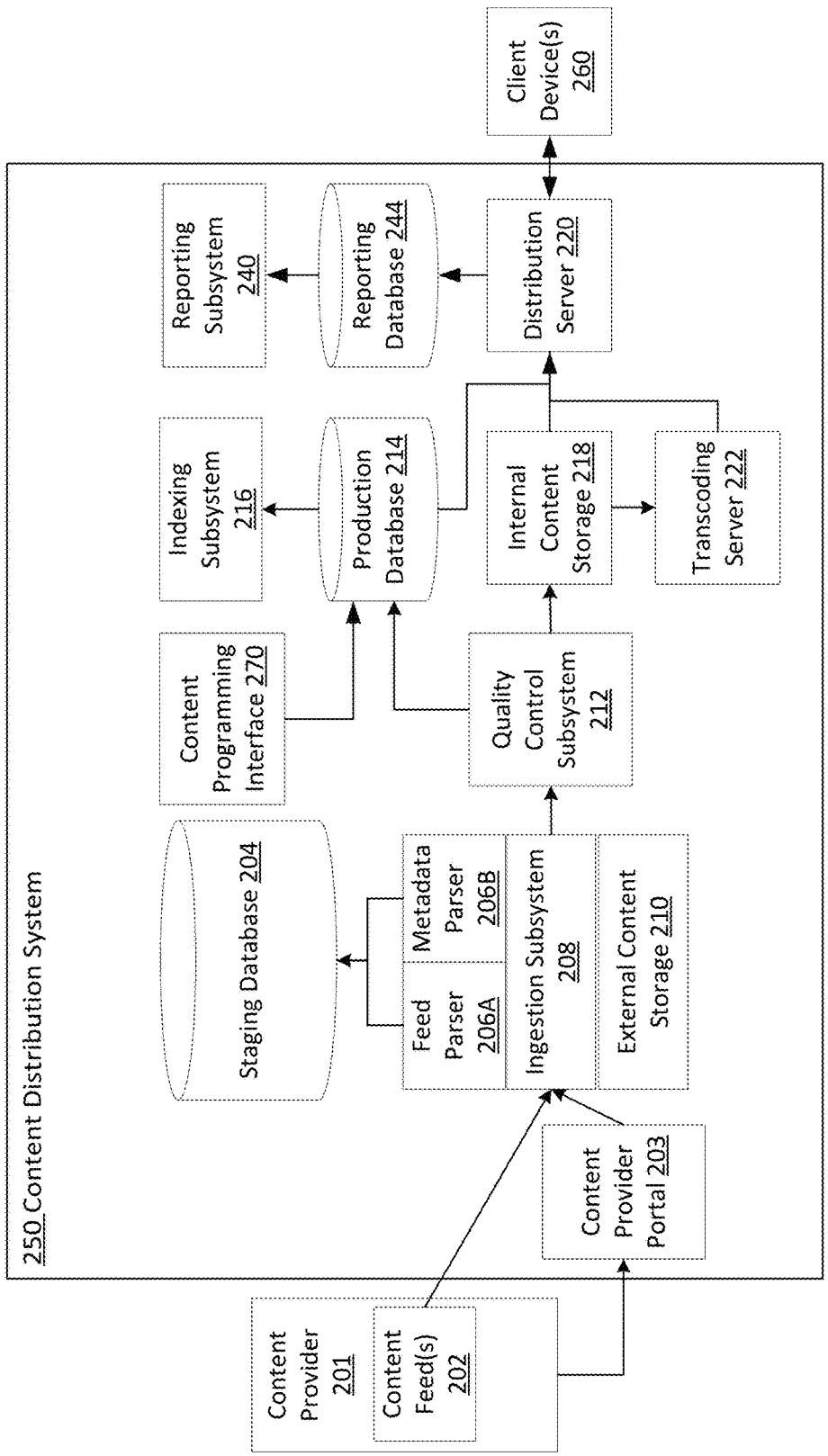
FIG. 2 is an illustrative view of various aspects of an example system 200 in which the techniques described herein may be practiced.

FIG. 2 is an illustrative view of various aspects of an example system 200 in which the techniques described herein may be practiced, according to an embodiment. System 200 comprises one or more computing devices. These one or more computing devices comprise any combination of hardware and software configured to implement the various logical components described herein, including components such as content provider server 201 and content distribution system 250. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Content Provider

System 200 comprises at least one content provider server 201 operated by a content provider for the purpose of providing content to content distribution system 250 and optionally one or more other systems or end-user client devices. Although only one content provider server 201 is depicted, in many embodiments there will in fact be many more than one content provider server 201 operated by a multitude of content providers.

Content provider server 201 may comprise one or more servers, which may host one or more content feeds 202. Content feeds 202 may be, for instance, web sites or application interfaces that respond to requests for specific items of content by streaming or otherwise sending one or more available components of those content items (e.g. the video portion, audio portion, etc.). Content feeds 202 may optionally publish one or more content listings, such as directories or hierarchies organized by categories, genres, and/or other attributes, that identify what content item components are found on the content provider's website(s) as well as how those content item components may be requested. The content listings may be published, for instance, as a collection of web pages or other structured data that, when interpreted by a browser or application at a client device, cause the client device to display the content listings. Content feeds 202 may further provide one or more search interfaces that receive search requests and provide content listings in response to those search requests.

Content feeds 202 may include frequently updated listings of contents that may be requested by or pushed directly to subscribers periodically and/or in response to being updated. For instance, a content publisher may update a feed 202 any time a new content item or content item component becomes available, or to promote a specific item of content. Content provider server 201 may provide a single content feed 202, or any number of content feeds 202, corresponding to different channels, genres, series, categories, or other collections of content. The content feeds may be published in any suitable format, including without limitation RSS, XML, JSON, and so forth.

2.2. Content Ingestion

Content distribution system 250 is coupled to one or more content provider servers 201 via one or more networks, such as the Internet. Via these one or more networks, an ingestion subsystem 208 of content distribution system 250 may support a variety of standards through which content partners or providers may provide content, such as feed-based formats, document files, transfer protocols, or third-party transfer services. Depending on the embodiment, the ingestion subsystem 208 may be configured to continuously scan for and detect new content items for the content distribution system 250 to distribute, and/or allow for content providers to explicitly instruct the content distribution system 250 to distribute new content items.

For example, the ingestion subsystem 208 may be configured to subscribe to, periodically download, and/or otherwise receive one or more identified content feeds 202 comprising content listings from each content provider server 201. Likewise, the ingestion subsystem 208 may optionally be configured to periodically download content listings from one or more feeds 202 of each content provider server 201. The ingestion subsystem 208 comprises one or more parsers, such as a content feed parser 206A, configured to parse, crawl, and/or otherwise analyze the content listings, and identify specific content item components to ingest based on this analysis. The ingestion subsystem 208 may then access content feed 202 to request and download the specified content item components.

In an embodiment, the ingestion subsystem 208 may also or instead be configured to host one or more content provider portals 203 by which content provider server 201 and/or users thereof may provide content item portions to the content distribution system 250. For instance, users may upload content item portions via a web page or File Transfer Protocol (FTP)-based server of such a portal 203. Or, the content provider server 201, or a user thereof, may identify specific content item components, by location, and/or attributes thereof, to be ingested by ingestion subsystem 208. For instance, a content provider may specify locations of content items using a form within a web page. Or, the content provider may upload an XML document or other suitable structured data to the portal 203, that identifies multiple content items and/or content item components for ingestion. Ingestion subsystem 208 may then download these content item components from the requested locations.

In an embodiment, the ingestion subsystem 208 may be configured to receive content item components in a variety of formats. The components may be received as, for example, video and/or audio files or streams in any supported format, including without limitation formats such as MPEG, MP4, MKV, WMV, FLV, MP3, WebM, HTML5, and so forth. There may be different video and/or audio components for different purposes, such as a versions having different resolutions or other video formatting characteristics, versions with or without commercials, teasers, expanded or alternate versions, alternate language tracks, and so forth. The components may also include subtitle files in various languages and formats (e.g. SRT or WebVTT), thumbnail image files or archives, metadata files in formats such as Excel spreadsheets or XML documents, and so forth.

In an embodiment, upon the content provider server 201 making certain content item components available, ingestion component 208 may immediately begin downloading the content item component, or queue the content item component for later download. Ingestion subsystem 208 need not receive a complete content item in a single download or at the same time. That is, ingestion subsystem 208 need not ingest every piece of data associated with a particular content item at the same time.

In an embodiment, ingestion subsystem 208 is configured to identify, for each content item component it receives, a content item identifier. Depending on the source and/or type of content item component, the content item identifier may be specified in the content listing that specified the location of the content item component, as part of a file name or URL for the content item component, as data input solicited from a user in a content submission form, as part of metadata within the content item component itself (e.g. a file header or tag), or any other associated data. The content item identifier may be extracted as a single, unique metadata attribute or field (e.g. a unique identifier specified by the content provider), or it may be generated by combining different metadata attributes or fields, such as a series identifier and episode number, or content title plus a date.

In an embodiment, one or more metadata parsers 206B are configured to identify various metadata related to content item components, which may include the content item identifier. For instance, a metadata parser 206B may be configured to parse an uploaded or downloaded excel file, XML document, web page, or other structured data for metadata associated with a given content identifier. Or, a metadata parser 206B may be configured to scan for tags or headers within content item components. In an embodiment, a feed parser 206A may itself function as metadata parser 206B for certain types of feeds that include one or more metadata attributes. Note that metadata may be gathered from a variety of sources, even for a single content item, and metadata parser 206B may also therefore comprise logic for reconciling differences in metadata from different sources (e.g. an uploaded metadata file versus metadata within a video file header or metadata found in a content feed 202).

Different content item components for the same item of content may be specified by different content listings and/or uploaded at different times. For instance, one content provider may provide video files for a content item, another might provide subtitle files for various languages, another might provide audio tracks for different languages, another might provide high definition video files, and yet another might provide enhanced metadata and thumbnails. Ingestion subsystem 208 is therefore configured to correlate these content item components by their respective content item identifiers.

Ingestion subsystem 208 stores the correlated components for each content item in association with the relevant content item identifier in one or more staging databases 204. A staging database 204 may be any structured repository of data, including without limitation database tables and/or hierarchical file structures. In an embodiment, certain types of content item components, such as large media files, may be stored outside of the staging database 204 within an external content storage system 210. The content item identifier may be associated with a pointer or link from staging database 204 to these content item components.

2.3. Quality Control

After an entry for a content item is generated in the staging database 204, a series of actions may still be performed before the content item is distributed by the content distribution system 250. These actions are described by configurable logic referred to herein as an "ingestion flow" or "processing workflow." Among other aspects, an ingestion flow includes monitoring the content item to ensure that the components collected for the content item thus far meet certain prescribed conditions, which are also referred to herein as quality criteria. The flow may include a number of different stages, each associated with one or more actions and one or more prerequisite conditions. Different flows may exist for different content providers, types of content, and/or specified groups of content.

Content distribution system 250 includes a quality control subsystem 212 to enforce the various quality criteria of these ingestion flows. Quality control subsystem 212 may be configured, for instance, to ensure that each content item component for a content item meet one or more quality criteria identified for the content item and the component type. The quality criteria to check for a given content item, or component thereof, may be determined, for instance, based on the content provider, type of content, series name, intended distribution channel, intended distribution geography, and so forth.

Examples of quality criteria for components that include video data may include, without limitation: minimum or maximum video resolution, minimum or maximum video bit rate, minimum or maximum duration, encoded using an acceptable codec and/or profile, conformance to other quality guidelines (e.g. no cinemascope, window-boxing, etc.), and so forth. Examples of quality criteria for components that include audio data may include, without limitation: minimum or maximum number of audio channels, minimum or maximum audio bit rate, minimum or maximum duration, minimum or maximum audio sampling rate, encoded using an acceptable codec and/or profile, and so forth. Examples of quality criteria pertaining to file wrapper formats for storing audio and/or video data may include, without limitation, whether or not the audio and video data is interleaved, and whether the file header is at the front or end of the file. Examples of quality criteria for thumbnail images may include, without limitation, thumbnail resolution, image quality (e.g. in dots per inch), and relevance of the image. Note that not all of the quality criteria need be checked for each content item component. For instance, content from one content provider may be checked to ensure that it is at least a minimum resolution (e.g. "720p"), whereas content from another provider may not checked for any resolution-related criteria.

If the quality control subsystem 212 determines that a given content item component fails any of the above quality criteria, the relevant ingestion flow may dictate that the quality control subsystem 212 take any of a variety of actions, depending on the embodiment and/or content provider. For instance, the component may simply be deleted. In an embodiment, all other collected components for the content item may also be deleted. In another embodiment, the other components remain in the staging database, while the quality control subsystem 212 waits to see if the content distribution system 250 will receive a replacement component that meets the relevant quality criteria. As another example, when certain types of quality checks fail, the quality control subsystem 212 may take proactive steps to "fix" the problem. For instance, if content is in a format that is not accepted, but may be converted to an accepted format, the quality control subsystem 212 may automatically perform the conversion (e.g. by transcoding the video). Or, the quality control subsystem 212 may proactively attempt to download a component that serves as a suitable replacement.

Other quality criteria may pertain to the content item on the whole. For example, quality criteria may specify that certain fields of metadata are needed before a content item may be published, such as a video title, genre, and language. Or, quality criteria may specify that the content distribution subsystem 250 must have fully received at least one component with video data and one component with audio data. As yet another example, quality criteria may specify that a certain language of subtitle or alternate audio data is required. Again, if such criteria are not met, the quality control subsystem 212 may wait for a time to determine if the problem will be fixed (e.g. to see if the missing components or metadata will be received). Or, in certain cases, the quality control subsystem 212 may be configured to attempt to resolve the problem itself—e.g. by generating thumbnail images based on the video data, searching for metadata, searching for the missing file(s), transcribing the audio data to produce a subtitle file, generating a machine translation of existing subtitles to produce translations in various languages, etc. In some embodiments, if the problem is not fixed after a certain amount of time, the content item may be removed from the staging database 204.

In an embodiment, the quality control subsystem 212 may notify a content provider, content distributor administrator, or other suitable entity of certain types of problems, and pause the ingestion flow until the entity fixes such problems. For instance, an employee of the content distributor may receive an email or desktop notification alerting the employee that a recently ingested content item failed a specific quality criteria check, and optionally provide the employee with guidance for how to fix the problem.

The quality control subsystem 212 may, for many if not all quality criteria, check the quality criteria automatically. However, in an embodiment, certain quality criteria may require user interaction, such as determining the quality of subtitles in terms of how accurately the subtitles were timed and/or translated, determining the relevance of the thumbnail to the content item, determining whether the video and audio is subjectively of "viewable" quality, and so forth (though even these checks may be automated in certain embodiments). When human interaction is required, the quality control subsystem 212 may "pause" the ingestion flow and wait for a user to perform the quality check before proceeding.

Ingestion flows may be of varying complexity. For instance, some flows may simply perform all quality checks in parallel or in any arbitrary sequence, whereas other flows may specify more specific sequences of checks and actions. For instance, the quality control subsystem 212 may be configured to delay checking for thumbnails and subtitles until video data and/or audio data has been fully received (or even for a specified time after the video data and/or audio data has been received). If the thumbnails and subtitles are not by then available, the quality control subsystem 212 may take prescribed measures to generate or download them, and/or to notify a user of their absence.

2.4. Content Publishing

In an embodiment, once quality criteria have been met, the quality control subsystem 212 prepares the content item for publishing. The preparation for publishing may involve, for instance, transferring some or all of the data for the content item in the staging database 204 to one or more production databases 214. In an embodiment, the preparation for publishing may also optionally involve copying content components from the external content storage 210 to the internal content storage 218.

A production database 214 may be similar to the staging database 204, but accessible to one or more distribution processes, such as a distribution server 220. Likewise, internal content storage 218 may be similar to external content storage 210, but accessible to the distribution processes. In some embodiments, external content storage 210 and internal content storage 218 may in fact be the same, and no copying of content item components is necessary. In some embodiments, the staging database 204 and production database 214 may in fact be implemented as a single database, in which staging data and production data are distinguished by the existence of one or more attributes indicating whether the data is ready for publishing.

The distribution processes to which production database 214 and internal content storage 218 provide access may take a variety of forms, such as web sites or application servers operated by the content distribution system 250. These distribution processes provide contents to client devices 260 operating web browsers or applications, and/or to external servers operated by other entities. For instance, a web server may generate a navigable hierarchy or other collection of web pages by which content items described by the production database 214 may be located. Each content item may ultimately be viewable via a separate web page that is generated based upon the information in the production database 214, and its underlying components are retrievable from the internal content storage 218 by links or elements within that page. Similarly, an application server may generate and send data to smartphone applications that allows those applications to view the content items described in the production database 214.

The distribution processes may be permitted to distribute a content item immediately upon it appearing in the production database 214, or the web sites and application servers may still be configured to wait for data associated with the content item within the production database 214 to indicate that one or more processing steps required by a relevant ingestion flow have been performed. The quality control subsystem 212 may initiate such processing steps and record within the production database 214 when such processing steps have been performed. Examples of such processing steps are described subsequently.

In an embodiment, a content item described by the production database 214 may be updated even after it has been published. For instance, the ingestion subsystem 208 may continue to receive different components of the content item, such as additional metadata and subtitles, or additional versions of the video data and/or audio data. Or, certain processing steps described herein may result in the addition of data for the content item after the content item is published rather than as a prerequisite for publishing. This may result, for instance, in different versions of content items and/or additional information about a content item being provided by the distribution processes as the content item is updated over time.

In an embodiment, one example processing step may be to index the content item based on its various metadata, thereby generating searchable indexes of the content items described by production database 214. To this end, content distribution system 250 may comprise one or more indexing subsystems 216 that perform the indexing at various levels of granularity. An index may assist both in the generation of content listings by various distribution processes as well as facilitating a search engine by which client devices 260 may search directly for content items having certain criteria. According to an embodiment, indexing may or may not be required before the content is deemed publishable. Moreover, the indexing may be performed on an ongoing basis, such as when the content items are updated.

In an embodiment, another example processing step may be to generate thumbnails, either instead of or in addition to any thumbnails that may have been received during the ingestion process. Any suitable thumbnail generation process may be utilized, and examples are described in subsequent sections. Again, thumbnail generation may be required prior to the content item becoming publishable, and/or some or all of the thumbnails may be generated after publishing, depending on the ingestion flow.

In an embodiment, another example processing step may be to create different distributable versions of the video data and/or audio data for different distribution channels. For instance, versions of the video data having different target characteristics such as resolution or bitrate may be generated by a transcoding server 222 and stored within internal content storage 218. As another example, the video data may be divided into multiple subunits referred to as "chunks" that may be distributed separately for bandwidth, marketing, or other reasons. For instance, a television episode might be divided into five-minute or ten-minute chunks, each of which may be downloaded separately instead of at once. Again, the ingestion flow for a content item may or may not require that this processing be completed prior to publishing. In yet other embodiments, some or all of the different versions may instead be generated on-demand by transcoding server 222.

2.5. Prioritization of Content Processing

Certain content items may be classified as having higher priorities than other content items. A content provider may provide metadata or other input that designates a content item as having a certain priority level, or the content distribution system 250 may be configured to automatically assign priority levels based on the content provider or type of content. For example, the content distribution system 250 may automatically assign a highest priority level to content that is designated as being "exclusive" or simulcast, and a lowest priority level to content that is designated as being old or "amateur."

Content distribution system 250 may be configured to prioritize the processing of content (including parsing, performing quality control, generating thumbnails, transcoding, and so forth) based on the priorities assigned to the content. For instance, ingestion subsystem 208 may be configured to access content feeds 202 with priority content more frequently than other feeds, or to stop or throttle downloading of lower priority content item components in favor of newly detected higher priority content item components. Similarly, the quality control subsystem 212 and other processing components may be implemented in such a manner as to prioritize content based on the assigned priorities. For instance, content distribution subsystem 250 may comprise dedicated hardware with separate parsers, transcoders, and other subsystems, to process content with a highest priority level. Or, content distribution subsystem 250 may be configured to change the priority of or suspend processes or threads based on the priority levels assigned to content items.

2.6. Publishing to Multiple Channels

According to an embodiment, content distribution system 250 may be configured to publish content to different distribution channels corresponding to different target demographics. The different distribution channels may correspond to, for instance, different geographic locations, languages, interests, subscription levels (e.g. paying or non-paying), service providers (e.g. cellular carriers or Internet Service Providers), client device types, and so forth.

In an embodiment, some or all of the distribution channels may have a different website or application portal by which they are accessed. In an embodiment, some or all of the channels may correspond to different sections of a website or application. In some embodiments, clients 260 may log into content distribution system 250 using user accounts. Each user account may be associated with one or more channels based on any of the factors described above. In an embodiment, a client 260 logged into a user account associated with one or more channels may only be presented content items from those channel(s). In an embodiment, the content distribution system 250 may present such a client 260 with content item(s) from those channel(s) by default, but nonetheless allow the client 260 to see and request content items from other channels.

The ingestion flows may be associated with different publishing rules for different distribution channels. For instance, for channels that correspond to different languages, the publishing rules may specify that a content item must have an audio file or subtitle in the relevant language before being published. Hence, a content item may be marked as publishable on a Chinese-language channel before an Arabic-language channel if a Chinese translation of the subtitles is available, but an Arabic translation is not. Or, a content item may be marked as publishable on a premium channel a certain predefined amount of time before being publishable on a non-premium channel.

2.7. Rights Management

In relation with publishing to multiple demographics, content distribution system 250 may include a comprehensive digital rights management (DRM) mechanism that verifies the rights of a given demographic or other user group to a specific content item before allowing it the content item to be distributed. A content provider may assign default rights to all of its contents, or specify rights on other bases, such as per-content or per-content type. These rights may be specified using any of a variety of standard or propriety DRM solutions, and recorded within the production database 214.

Examples of such rights may include geographical rights restricting the distribution of a content item to a certain country or region, platform rights restricting the distribution of a content item to certain distribution platforms, device rights restricting the distribution of a content item to certain types of client devices, product rights restricting the distribution of a content item to devices associated with certain paid subscriptions or licenses, and so forth.

Rights may further be specified on a per-component basis. For example, high definition or commercial-free video versions of a content item may be restricted to certain groups of users (e.g. subscribers to a premium product), whereas other video versions may not be restricted.

Rights may include time-expiring elements. For example, a certain demographic or group may receive rights to a content item for only a certain period of time. Or, a certain restriction on the rights of a content item may be specified for only a certain period of time, after which the certain restriction no longer applies.

2.8. Reporting Subsystem

According to an embodiment, information related to some or all actions taken during an ingestion flow are recorded by the ingestion subsystem 208 and/or quality control subsystem 212 in one or more reporting databases, such as reporting database 244. For instance, the reporting database 244 may indicate, without limitation, how many content items or components were received by the content distribution system 250, when each content item component was received, how long the upload of a content item component took, the results of various quality-control validation checks, how long a content item stayed in the staging database 204 before it was released to the production database 214, and so forth.

Distribution processes such as server 220 may likewise record various information related to content item distribution in the reporting database 244. For instance, the distribution server 220 may record the identity of each content item it distributes and when each content item was distributed. Information indicating how often and/or when other events occur may likewise be recorded, such as requests for specific content items, searches for specific content items, recommendations of certain content items, purchases of specific content items, and so forth. Information about client devices involved in each event may be recorded, such as the type of client device, the location of the client device, a user identifier associated with the client device, demographic information associated with that user identifier, whether the client device had a certain subscription, how long the client device took to download a content item, which specific components of the content item were accessed (e.g. the language of the audio or format of the video), how much of the content item was actually consumed by the client device (e.g. how much of a video the user actually watched), and so forth.

According to an embodiment, content distribution system 200 may include a reporting subsystem 240 configured to analyze and report information in the one or more reporting databases 244. Reporting subsystem 240 may comprise, for instance, a web site or application interface configured to communicate information with content provider system 201, or a user thereof. The reported information may simply be information stored in the one or more reporting databases 244. Or, the reported information may be derived from the information stored in the one or more reporting databases 244.

For instance, the information may include graphs or charts illustrating metrics derived from information logged in a reporting database 244, such as of a total number of content items ingested or distributed over a given period of time. Such information may further be subdivided by various attributes of the content items and/or client devices to which the content items are distributed. Reporting subsystem 244 may further report information via notification messages that are sent in response to defined events or triggers with respect to information in a reporting database 244.

2.9. Content Programming

According to an embodiment, the distribution server 220 may comprise one or more content programming interfaces 270 by which administrators of content distribution system 250 can edit content and/or organize the distribution of content by the various distribution processes. Administrators may utilize the interface(s) 270, for instance, to edit a content item, refine or add content item metadata in the production database 214, generate playlists or other organizing constructs by which various content items are grouped, define priorities of content items in certain distribution channels (e.g. what content items to promote to a given demographic), and so forth.

The edits and programming information specified using these interfaces 270, in turn, affects the manner in which the web sites, applications, and other distribution processes of the content distribution system 250 present and navigate the content described in production database 214. In embodiments where content items are distributed via multiple distribution channels, an interface 270 may provide a convenient way to program content across different program products, regions, and other demographics from a single interface. For instance, an administrator may specify that a particular content item should be promoted as a main feature on all sites to which it has been published, or only to certain sites targeted to specified demographics. Or an administrator may create a playlist of content from multiple providers, which then automatically shows up on a number of sites that target viewers who speak a particular language.

In an embodiment, a content programming interface 270 includes an internal finding tool that is used for easier content discovery for programming. The tool may be coupled to production database 214 and/or reporting database 244. Using particular metadata fields or ingestion/consumption metrics stored therein, the tool may thereby support open search or advanced search mechanisms for a particular content item. The finding tool may further include features such as auto-complete. Results may be filtered and/or sorted by any suitable metadata field, including, without limitation, content genre, popularity, duration, video views, and so forth.

According to an embodiment, the interfaces 270 may be interlinked with a unique "carry tray." An administrator may add any content items he or she finds to be of interest to the "carry tray," from which the administrator may retain the content items for any further improvements across other editing tools, such as editing a content item or its metadata, chopping/trimming a content item, making thumbnails, and so forth.

In an embodiment, content may be grouped together in a playlist referred to as a "Context." A context can be automatically created by the system based on, for instance, a defined keyword or tag in the content meta-data. An interface 270 may then permit a content editor to edit the context based on his or her requirements. A context may be static, or periodically refreshed as re-useable programming unit. A context may even be automatically created and shared among various distribution channels with or without input from a human administrator or editor.

2.10. Miscellaneous

System 200 illustrates only one of many possible arrangements of components configured to provide the functionality described herein. Other arrangements may include fewer, additional, or different components, and the division of work between the components may vary depending on the arrangement. For example, in some embodiments, indexing server 216 or transcoding server 222 may be omitted, along with any other components relied upon exclusively by the omitted component(s), and their operation may be performed by one or more other component(s).

3.0. Functional Overview

In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. General Ingestion and Distribution Flow

FIG. 1 illustrates an example flow 100 for processing content item components, according to an embodiment. The various elements of flow 100 may be performed in a variety of content distribution systems, including systems such as system 250 described above.

Flow 100 is performed on an ongoing basis, resulting in many different iterations of flow 100 being performed over time with respect to many different content item components received for many different content items from potentially many different providers. The iterations may be performed concurrently, with respect to both components of the same content item and different content items. Each iteration of flow 100 begins with the reception of a content item component via performance of either blocks 110-115 or block 120. The component may be, for example, a file, record, data stream, or other suitable structure containing one or more video and/or audio tracks, metadata components, subtitle components, image components, and so forth.

When reception occurs via performance of blocks 110-115, the content distribution system proactively acquires content. In block 110, the content distribution system monitors provider-specified content feeds to determine when the feeds identify (e.g. contain, link to, or otherwise reference) a source for a content item component that the content distribution system has not previously accessed. When a new source is identified, the content distribution system downloads the content item component from the identified source in block 115.

When reception occurs via performance of block 120, the content distribution system receives an upload of the component from a provider via a suitable interface, such as content provider portal 203. The interface may be, for example, a web interface to which the provider logs in for submitting content, an FTP site to which the provider has been instructed to upload content, an API via which an external application operated by the provider is configured to submit content, or any other suitable interface.

From block 115 and block 120, flow 100 proceeds to block 130. Block 130 comprises determining an identifier for the content item to which the newly received component belongs. Determining the identifier may comprise, for instance, extracting the identifier from the name of a file in which the content item component resides and/or a URL at which the content item component resides. Determining the identifier may also or instead comprise extracting the identifier from a tag or metadata field associated with such a file or URL. In an embodiment, determining the identifier may instead involve generating the identifier using a function applied to one or more of the file name, URL, and/or metadata fields. For instance, the identifier may be a combination of one or more of a content provider identifier, title, series identifier, episode number, series number, season number, publication year or date, genre, and so forth. In an embodiment, determining the identifier may involve using any one or more of the foregoing to instead lookup the identifier in a database. If no matching identifier is found in the database, a unique identifier may be generated using any suitable logic (e.g. based on the current date, time, component source, and/or a random function). In any event, the identifier should be generated and/or determined in such manner that each content item has a unique identifier, and that the same identifier will be determined for all of the components of that content item.

Block 135 comprises storing the item component in association with the identifier. The item component may be stored in a file system, database, or any other suitable repository. For instance, in an embodiment, each content item identifier is associated with a directory within a file system (e.g. a directory named after the identifier, or a directory whose name is referenced in a database record of the identifier), and each received component is stored within that directory. Or, each content item identifier may have one or more database records that collectively specify the location of each component of the content item. Or, the component may be stored directly within a database in one or more database records for the content item identifier. In an embodiment, if the component is or comprises metadata, a parser may extract some or all of the metadata fields and store the extracted fields individually within one or more records for the content item identifier. In some embodiments, the component may be stored within an initial staging area in block 135.

Block 138, which is optional depending on the component type, provider, priority level, and/or embodiment, comprises subjecting the component to one or more quality control checks. For instance, audio or video data may be checked to ensure that it is of an acceptable format (e.g. not low resolution, having a recognizable encoding, etc.). An automated process or human operator may also review the video or audio data to ensure that it is of viewable quality (e.g. not too shaky, noisy, blurry, etc.). Subtitles, metadata, and thumbnails may similarly be reviewed by an automated process or human operator to ensure that they are of acceptable quality and relevance. Block 138 may be a blocking step, in that the current iteration of flow 100 is halted while awaiting successful completion of block 138. Or, flow 100 may continue as block 138 is performed. In either case, the content item component may be deleted if the quality control check(s) of block 138 fail.

Many if not all of the quality control checks may be automated. In embodiments where human input is used, however, when a new content item component is received, a notification message may be sent to a human operator to perform one or more of the quality check(s). Responsive to the message, the human operator may access a suitable interface of the content distribution system to view the component and perform the quality check. The interface may include a mechanism for providing "pass/fail" input. If the human operator selects "fail," the content distribution system may remove the component from storage. If the human operator selects "pass," the content distribution system continues with flow 100. Note that such human input may be provided at the same time as other input described with respect to block 145 below, rather than as a prerequisite to performing block 145.

Block 140 comprises determining whether additional processing is needed for the component. Depending on the component type, a variety of additional processing steps may be needed. The exact processing needed may be determined using predefined processing rules identified for the content item. Such rules may be specified by the content distributor and/or by the provider of the content item. The rules may be specific to the individual content item identifier, a publisher, a type of content, a genre of content, a series of content, a target publishing channel(s), or any other suitable context.

If additional processing is required, then block 145 is performed in parallel with the remainder of flow 100. Block 145 comprises performing the additional processing. The result of the processing will generally be that additional metadata or other components of the item are stored in association with the content item identifier. Additional component(s) may be generated by the content distribution system directly, and/or the content distribution system may send a notification or other information to an external entity or component to trigger generation of additional component(s). In the latter case, the additional components may be ingested in similar manner as any other component (e.g. returning to blocks 115 or 120).

For instance, if the component includes video data, the content distribution system may detect the format of that video data. The format may include characteristics such as bitrate, resolution, encoding, and so forth. If the format is not a preferred format, the content distribution system may transcode the video data into another format and store the transcoded file instead of or in addition to the original video data. Or, even if the format is a preferred format, one or more additional formats may be desirable for different publishing contexts. Hence, the video data may be transcoded into these formats, and the results stored in association with the content item identifier.

Similar transcoding may be needed for audio data. Additionally, depending on the publishing context, translations and/or subtitles of the audio may be needed. The audio data may therefore be sent to translation and/or transcription services. In some embodiments, the services may be entirely automated using speech recognition and/or translation software. In other embodiments, the services may be services provided by human operators. The processing may therefore involve sending a link or notification to the individual(s) responsible for providing translation and/or transcription.

In an embodiment, block 145 may comprise soliciting metadata for a content item. For instance, the content item component may have arrived at the content distribution system with minimal or no metadata. Block 145 may therefore comprise requesting an analysis of the content item from a suitable entity (or automatic classification algorithm). Such an analysis may involve, for instance, analyzing titles or other information within the opening scenes or closing credits of a program to identify metadata fields such as program titles, actors or actresses, director names, publication dates, and so forth. Such an analysis may also or instead involve identifying actors or actresses using facial recognition logic. The analysis may furthermore involve identifying or summarizing plot elements, providing a critical review, classifying the content, and so forth.

In an embodiment, block 145 may comprise sending subtitles to one or more translation services. Again, the translation services may be automated, or human-operated. In an embodiment, block 145 may comprise generating thumbnails for the content item, using thumbnail generation logic such as described in other sections. In other embodiments, any other additional processing may be performed in block 145, including, without limitation, segmenting the content item into chunks, inserting promotional content into the video and/or audio data, and so forth. In an embodiment, the sequence of the additional processing may be prioritized, such that higher priority tasks (e.g. longer tasks or tasks needed before publishing) begin and/or complete before other tasks.

In other embodiments, no additional processing is needed. This may be true for a variety of reasons. For instance, in some embodiments, the content distribution system is configured such that all necessary components are expected to be received from the providers without intervention by the content distributor. In other embodiments, content distributor intervention is needed for some of the content item components, but not triggered because initial requirements for the additional processing have not yet been met. For instance, the content distributor may require that a certain subset of components be received before committing to any additional processing, such as at least one video track, at least one audio track, and a title field for the metadata. Such initial requirements may be described by the afore-mentioned processing rules, which again may vary depending on the provider, target channels, content priority, and/or other contexts. In some instances, no additional processing is needed at block 140 because the required additional components have already been received or generated through previous iterations of flow 100.

Whether or not additional processing is needed at block 140, flow 100 proceeds in parallel to block 150. Block 150 comprises identifying relevant publishing rule(s) for each channel to which the content item will be published. In embodiments where a content item is not published to all available channels, block 150 may involve a precursor step of identifying target channels for the content item. One or more distribution rules may be used to identify the target channels for an item of content. These distribution rules may be based on the content provider, content type, genre, original audio language, or any other suitable metadata.

Each channel may have its own associated publishing rule(s) that indicate when a content item is ready for publishing. Example factors upon which such publishing rules may be built include, without limitation: the existence of a video track for the content item, the existence of a video track in a certain format, the existence of an audio track in a certain language, the existence of subtitles for a certain language, the existence of certain metadata field(s), the existence of an approved thumbnail, a specified amount of time having elapsed since an initial publication date, and so forth. For example, one channel may require that the content item have at least one audio track in Chinese. Another channel may require a subtitle track in English and a video track that has been transcoded into a particular mobile format. A wide variety of publishing rules may exist for different contexts.

It will be recognized that the publishing rules and the processing rules are closely related, and may in fact be described at least partially by the same logic. A strict separation between the logics of block 140 and block 155 need not be required.

At block 155, it is determined whether the publishing rule(s) for a particular channel are met. Block 155 may be performed with respect to each channel to which the content item is targeted. If the publishing rule for the particular channel is not met, flow 100 may wait for generation of requisite components via block 145 and/or return to blocks 110/115 for the receipt of any additional components that may be needed.

When the publishing rule for a particular channel is met, flow proceeds to block 160. Block 160 comprises publishing the content item to the particular channel. Publication generally results in information about the content item being made available to clients via one or more listings of the content item in the channel's feed(s), portal(s), search interface, or other interfaces.

Publication may involve a variety of steps, depending on the content distribution system. For example, in one embodiment, publication involves flagging the content item identifier as publishable to the channel. A content management application, upon seeing that the content item identifier is flagged, will then automatically include the content item in various publishing operations, such as in publishing feeds, generating portal web pages, sending notification messages to clients, and so forth. In an embodiment, publishing may also or instead involve indexing the content item based on its metadata, thereby ensuring that the content item is identified in searches and publishing processes. In an embodiment, publishing may also or instead involve moving information about the content item from a staging database to a publishing database. Of course, any other suitable publishing mechanisms may also or instead be utilized.

Block 170 comprises distributing the content item to clients. That is, as soon as information about the content item is published, clients may begin to send requests for the content item to a web server or other server of the content distribution system. The content distribution system may then respond by returning some or all of the components of the content item to the requesting clients. The exact components returned may depend on the channel, client type, or even the request. For instance, a video data component formatted for mobile clients may be returned to mobile clients. As another example, an English audio component may be returned when the request for the content is triggered by publication of the content on an English-speaking channel. As yet another example, a client may specifically request a certain language for the audio component or subtitle component.

Block 180 comprises recording distribution events. For instance, the content distribution system may log each time information about an item is delivered to a client and each time the item is actually distributed to the client. Depending on the sophistication of the interactions between the client and the content distribution system, the content distribution system may further log information about the client or a user account associated with the client, or even information regarding how long the client actually played the content item. Events may be recorded individually and/or aggregated over time to generate various metrics.

Block 190 comprises generating one or more reports of distribution events and/or ingestion events to the provider that provided the content item. Reports may be provided via a web application or any other suitable interface. The reports may be provided on a per-content item, per-channel, or per-provider basis. Reports may furthermore be provided in real-time, or on a delayed basis. Example reports and uses thereof are described in other sections.

Note that the processing of block 145 and the receipt of new content item components in blocks 115/120 may continue even after the content item is published and distributed to a particular channel. For example, new or updated metadata may be received with greater details or updated ratings. Or, additional translations or versions of various content item components may be received. Some of the new components may be needed so that the content item can be published to one or more additional channels. However, new components may continue to be generated or received even after the content item has been published to all of its targeted channels.

When a new component is available, published listings for the content item may optionally be updated to include information about that component. Where the new component is a playable component (e.g. new audio, video, or subtitle), the updated listing may enable a user to request this new component, even if the client has already played the content item. Where the new component is new metadata or a thumbnail, the updated listing may increase the likelihood of a user seeing the content item or deciding to request the content item.

Flow 100 is but one example of a flow for processing content item components using the described systems and techniques. Other flows may include fewer or additional steps, in varying orders.

3.2. Prioritized Handling

Figure 3:
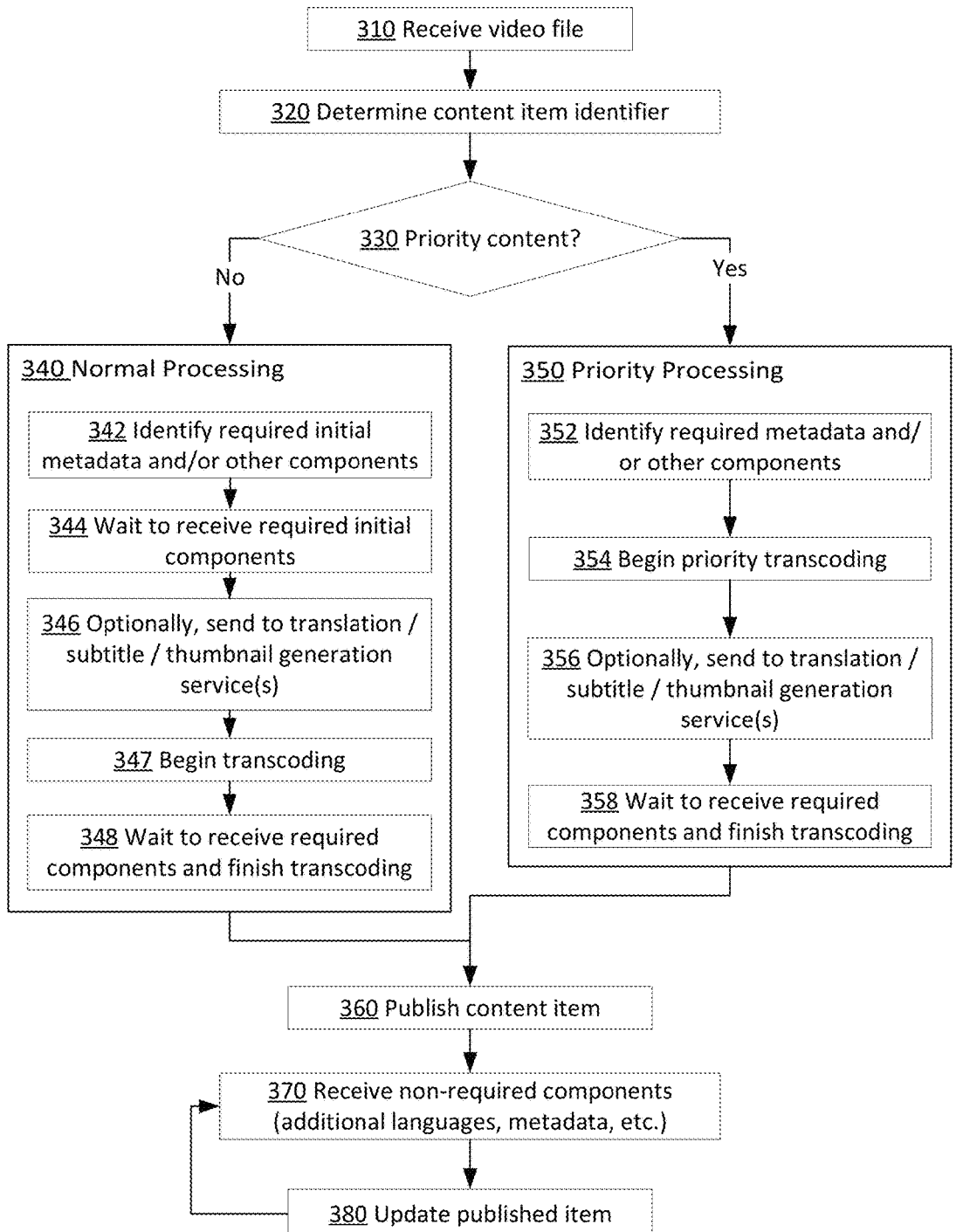
FIG. 3 illustrates an example flow 300 for prioritized processing of content item components.

FIG. 3 illustrates an example flow 300 for prioritized processing of content item components, according to an embodiment. The various elements of flow 300 may be performed in a variety of content distribution systems, again including systems such as system 250 described above. In some embodiments, flow 300 represents a specific use case for the processes described in flow 100. In other embodiments, flow 300 may be performed without necessarily performing flow 100.

Block 310 comprises receiving a video file. The video file may be received in a variety of manners, including those discussed with respect to blocks 110-120 of flow 100. The video file may be in any suitable format. Optionally, certain quality checks of the video file (e.g. to ensure that the video file contains properly formatted video data) may be performed at this time.

Block 320 comprises determining a content item identifier for the video file, in similar manner as explained with respect to block 130 of flow 100.

Block 330 comprises determining whether the content item is to be processed using normal processing or priority processing. The content distribution system may by default process content using a "normal" workflow, but make available a "priority" workflow for content that should be published more quickly. For instance, it may be desirable to ensure that content from certain key providers is published more quickly. Or, it may be desirable to be able to publish certain content items as quickly as possible to enable "simulcasting" of that content with another distribution mechanism (e.g. broadcast television), or to enable distribution of that content while demand for that content is at its peak.

This determination of whether the content item is to be processed using normal processing or priority processing may be made in a variety of manners. For example, all content received from a predefined set of providers, feeds, and/or portals may be processed using priority processing, and all other content may be processed using normal processing. As another example, a content distribution system may include a special interface (e.g. web page or API) for uploading content that is to be processed using priority processing, and all other content may be processed using normal processing. As yet another example, a content item may be flagged for priority processing based on data submitted with the video file, or data found within a feed or portal via which the video file was retrieved. For instance, the content distributor may advertise that priority processing is available to a provider for a fee so as to enable simulcasting of the priority content, and the provider may thus select simulcasting when uploading the video file or related metadata for the content item.

As yet another example, the content distributor may identify content items having specific metadata (e.g. series name, genre, publication date, etc.) or even a specific content item identifier as content to be processed using priority processing. In such embodiments, it is assumed that such metadata is either included in the video file, or provided in advance of receipt of the video file. As yet another example, the content distribution system may programmatically identify "high priority" content using machine learning and/or ranking algorithms that take into consideration a content item's metadata and previously recorded metrics for content items with similar metadata. Thus, content items predicted to be in high demand relative to other content items may be programmatically identified and selected for priority processing.

If the content item is to be processed using normal processing, flow proceeds to block 340. If the content item is to be processed using priority processing, flow proceeds to block 350.

Normal processing in block 340 is performed using a subflow comprising blocks 342-348. Block 342 comprises identifying initial processing requirements for the content item. One or more processing rules associated with the content item, the provider of the content item, or its target channel(s), may indicate an initial set of components that is required before processing of the video file may begin. Beyond the video data in the video file, this initial set may include, for example, an audio component (optionally in a required language), and one or more minimal metadata fields. The required initial set of components may optionally include subtitle(s) and/or thumbnail(s) as well. The initial processing requirements may also optionally include passing certain quality checks. In general, the initial processing requirements are a set of requirements intended to ensure that the uploaded video file is actually publishable before committing resources to processing the video file.

Block 344 comprises waiting for completion of the initial processing requirements. If the required initial set of components is contained entirely within the video file, this step may be trivial. However, in some embodiments, at least some of the video files will be missing at least one required component. Hence, block 344 involves waiting to receive the missing component before proceeding.

In embodiments where the initial processing requirements include one or more quality control checks, block 344 may also comprise waiting for one or more automated processes to determine that the content item passes one or more quality control checks, sending a message requesting performance of one or more quality control checks, and/or waiting for input indicating that a human operator has found the content item to pass one or more quality control checks. In an embodiment, if the content item does not pass the required quality control checks, the video file and/or other components of the content item may be discarded and flow 300 may terminate.

Block 346 comprises, optionally, sending the video file and/or other content item components, or a reference thereto, to additional processing services for generating translation(s), subtitle(s), additional metadata, and/or thumbnail(s), in similar manner as discussed with respect to block 145 of flow 100. Hence, block 346 initiates the generation of any additional audio component(s), subtitle(s), metadata, and/or thumbnail(s) that may be desired for the content item, in accordance to processing or publishing rules for the content item.

Block 347 comprises beginning transcoding of the video file into one or more additional formats, again in similar manner to that described with respect to block 145 of flow 100. Note that the sequence of blocks 346 and 347 is interchangeable.

Block 348 comprises waiting to receive or generate any required components for publishing that have not yet been received. The required components for publishing may be indicated by publishing rules, in the same manner as described with respect to blocks 150-155 of flow 100. Block 348 may involve, for instance, waiting for completion of certain transcoding and/or other processes initiated by blocks 346 and 347. For instance, block 348 may comprise waiting for thumbnails to be generated, or waiting to receive subtitles in a certain language requested for a certain distribution channel. Or block 348 may comprise waiting for the video file to be transcoded or chunked into units that are distributable for a certain distribution channel. In some embodiments, block 348 may also or instead involve waiting for confirmation that one or more final quality checks have been performed, that were not required prior to block 344.

Meanwhile, priority processing in block 350 is performed using a subflow comprising blocks 354-358. Block 354 comprises beginning transcoding of the video file, as in block 347. Block 356 comprises, optionally, sending the video file and/or other content item components, or a reference thereto, to additional processing services for generating translation(s), subtitle(s), additional metadata, and/or thumbnail(s), as with block 346. Block 358 comprises waiting to receive or generate any required components for publishing that have not yet been received, as in block 348.

Note that, though not depicted, block 350 may in some embodiments also include steps similar to blocks 342 and 344, and thus involve checking for initial processing requirements. Hence, on account of similarities between blocks 340 and 350, in at least some embodiments, blocks 340 and 350 may actually be performed using the same workflow, but involve utilizing different computing resources. For instance, priority processing 350 may be performed by a set of dedicated resources that are configured to execute more quickly than a set of shared resources utilized to perform normal processing 340. In an embodiment, these dedicated resources may involve distinct processors, memories, or even servers. In an embodiment, these dedicated resources may also or instead involve computing processes or threads on the same system as the shared resources, but assigned to higher operating system priorities.

In some embodiments, blocks 352-358 may in fact constitute a different workflow from blocks 342-348, having different initial processing requirements or other distinctions. For example, in some embodiments, a consequence of priority processing 350 is that the transcoding of the video file, which is often one of the most resource intensive processing tasks, may begin without having yet confirmed that some or all of the initial processing requirements of block 342 are met. Likewise, the processing requested in block 356 may be undertaken without having yet confirmed that some or all of the initial processing requirements of block 342 are met. Hence, in undertaking priority processing 350, the content distribution system is taking a risk that significant system resources will be consumed transcoding or generating additional components for content that is ultimately not publishable. However, this risk is typically offset by the desirability of publishing priority content earlier, as well as, in many cases, an increased likelihood that content items deemed to be priority content items will be publishable.

From blocks 340/350 flow proceeds to block 360. Block 360 comprises publishing the content item, as described with respect to block 160. If the item is to be published to multiple channels, blocks 348/358 and 360 may be performed separately for each channel to which the content is published, since the publishing requirements of one channel may be met before those of another channel.

Block 370 comprises, optionally, receiving non-required components, such as components in additional languages or supplemental metadata, that were not required for publishing the item to a channel initially. Generation of these non-required components may also have been triggered by blocks 346, 347, 354, or 356, or these non-required components may be received without having been requested. Block 370 may optionally involve performing quality checks on these components.

Block 380 comprises updating the published item to include the non-required components. Thus, a published listing for a content item may change over time as its metadata is updated. Additional components (e.g. other languages, director commentary, expanded versions, alternate formats, etc.) may also be made available in the updated listing.

As with flow 100, flow 300 is but one example of a flow for processing content item components using the described systems and techniques. Other flows may include fewer or additional steps, in varying orders. For example, in an embodiment, rather than having just two levels of processing, there may in fact be three or more levels of priority, each being processed using different workflows and/or different resources. Each priority level may have its own initial processing requirements (or lack thereof). As another example, in an embodiment, some or all of blocks 346, 347, 354 and 356 are omitted, as it may be assumed that transcoded files and/or additional components required for publishing will be provided by an external entity for some or all workflows.

4.0. Implementation Examples 4.1. Thumbnail Generation

In some embodiments, thumbnail images may be generated at various times as part of the ingestion or processing of a content item. In general, these thumbnails are generated by capturing specific video frames in the video data of a content item as snapshot images. For instance, in an embodiment, one or more thumbnails may be generated by taking snapshot image(s) of video frame(s) at designated time(s) or intervals. The number of thumbnail images may be pre-defined, or vary based on factors such as the content provider, distribution channel, or duration of the content item. Different resolutions of a thumbnail may also be generated for different contexts (e.g. a mobile thumbnail versus a full-size thumbnail).

In an embodiment, at least one of the thumbnail images is assigned a priority status, so as to determine which thumbnail(s) appear most prominently in content listings or previews of the content item.

In an embodiment, various processes may be utilized to prioritize and/or filter video frames so as to determine which video frames to use as thumbnails in a given context. For example, facial recognition logic may be utilized to identify video frames in which significant actors or actresses appear in the video. The automatically generated thumbnails may be limited to or prioritized by those that include certain faces (e.g. those of the "main" actors or actresses specified by the metadata for the content item, a special guest star mentioned in the metadata, a highly popular actor or actress, etc.). Or, a thumbnail may be selected for each distinct face appearing in a video. As another example, various image processing techniques may be utilized to recognize video frames that depict certain places or items mentioned in the metadata for the content item, and prioritize such thumbnails. As yet another example, various image processing techniques may be utilized to recognize video frames which are more aesthetically pleasing than other video frames, and prioritize those video frames for capture.

In an embodiment, thumbnail generation may be a human-assisted process. Multiple candidate thumbnails may be generated automatically through processes such as described above. A human operator may then be required to select one or more of the candidate thumbnails.

In an embodiment, thumbnail images may further be tagged with the names of persons, places, or things recognized through the above processes. Such tags may further be utilized to provide context-sensitive thumbnails. Hence, if a user is searching for movies in which a certain actress appears, the thumbnails displayed to that user for each of the movies in the search results may be selected so as to include the actress. Or, if user profile information indicates that a certain user is interested in films about submarines, and a certain thumbnail includes a submarine, that thumbnail may be displayed more prominently to the certain user.

4.2. Example Reporting Interfaces

Figure 6:
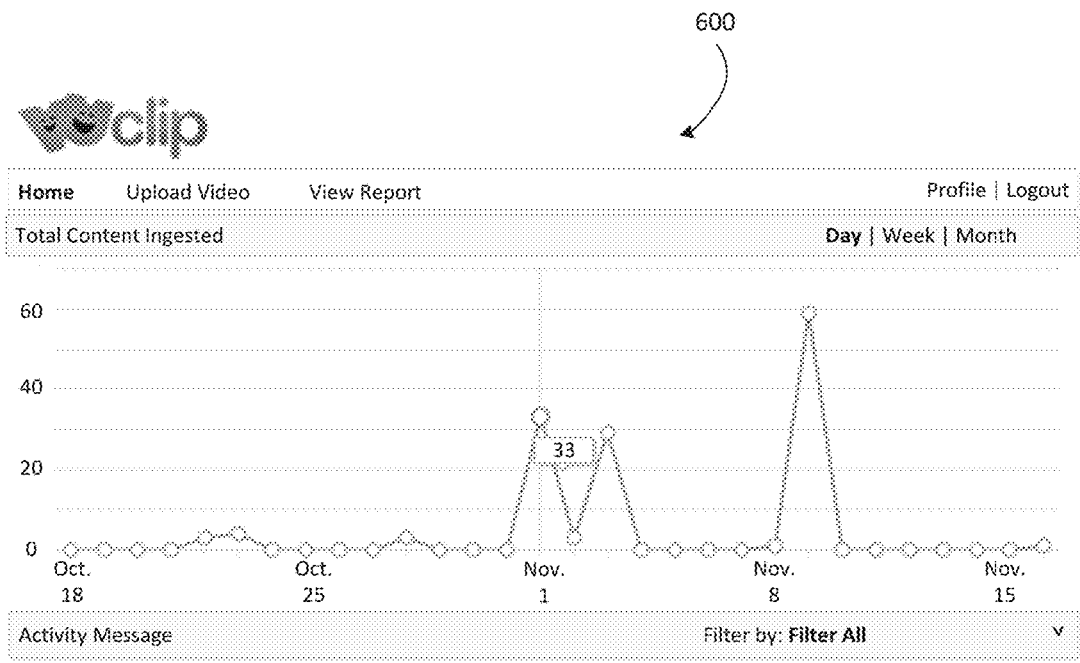
FIG. 6 illustrates two example reports that a content distribution system may make available to a content provider.
Figure 6:
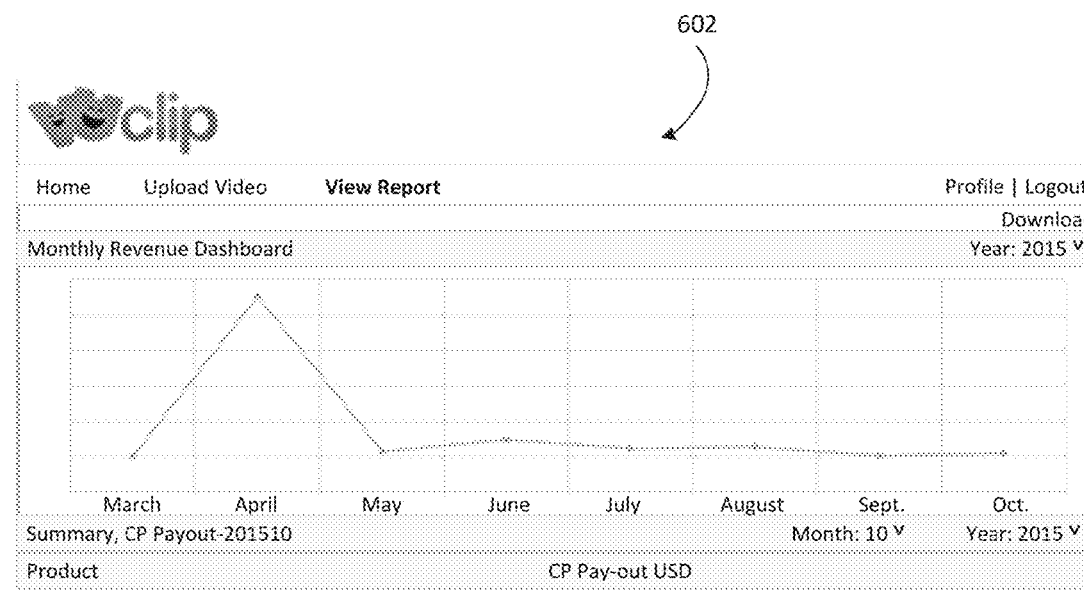

FIG. 6 illustrates two example reports 600 and 602 that a content distribution system may make available to a content provider by, for example, accessing a content provider interface dashboard hosted by reporting subsystem 240.

In report 600, a graph of the total content ingested for a specific content provider over a month is plotted. A content provider user may click on the 'view report' tab for a detailed view of the aggregate graph data. Content analytics based on content item categories, such as genre, title, geographical region, language, etc., may be displayed in a listing that ranks content by performance within each category, over a specified time period. In an embodiment, content performance can be evaluated based on the most viewed content, most downloaded content, or some other factor.

In report 602, a graph of the total revenue generated by uploaded content associated with a specific content provider is shown. Report 602 may be linked from report 602 with revenue as a report parameter. Individual revenue amounts for content items may be depicted based on content categories such as genre, title, geographical region, and language.

According to an embodiment, both of reports 600 and 602 may refresh in real-time upon the occurrence of a new consumption event. In an embodiment, either report may be reconfigured using various interface controls to display information at different time frames, such as on a daily, weekly, or monthly basis. In an embodiment, either report can be narrowed to display the particular performance of a particular content item, or the performance across content item categories, such as genres.

Of course, reports 600 and 602 are but examples of the types of reports, graphs, and metrics that a content distribution system may generate. Other reports may include different types of visualizations and combinations of metrics. In an embodiment, such reports may assist a content provider in identifying specific types of content the content provider wishes to upload to the content distribution system. For example, a content provider user may set an automatic upload option of media content for content types that the reports indicate meet a certain performance threshold within a content category. For instance, a content provider user may notice that romantic comedy movies fare exceptionally well during the summer months, and may automate the upload of newly released romantic comedy movies for the months of June to August.

In an embodiment, a consumption report may be separately and internally generated for content items, to report how viewers are interacting with the published content files. For example, the frequency with which users select an audio or subtitle file of a particular language for a video file having several associated audio or subtitle tracks in different languages may be a point of interest for the content distributor, and the content distribution system may therefore be configured to provide such a report.

4.3. Subtitle Indexing and Searching

In an embodiment, the subtitle text of a content item may be indexed in addition to the metadata of the content item. A user may thus locate content of interest by searching for keywords or phrases that may appear in the subtitles of the content item. For example, if a user is interested in searching for all video programs which mention a certain holiday, such as "Christmas," or a certain person, like "Donald Trump," they may perform a subtitle search, and the content distribution system may respond with all content items in which "Christmas" or "Donald Trump" appeared in the subtitles. Similarly, if a user remembers seeing a preview of a program in which a certain phrase was mentioned, but does not know the title of the program, the user may search for the phrase and receive a list of all programs in which the phrase appears.

A content distribution system may provide a variety of advanced search functionality to support subtitle search. In an embodiment, a free text search may automatically search both subtitles and metadata. In an embodiment, a search interface may include a mechanism for allowing a user to search just the subtitles. In an embodiment, a search interface may include mechanisms to filter the search results by various constraints, such as by actor, title, series, date, genre, subtitle language, audio language, required subscription levels, and so forth. The results returned via a given search interface may optionally be constrained to content items that have been published to one or more specific channels associated with the given search interface and/or a user account associated with a given query to the search interface. In an embodiment, a search interface may include a mechanism for inputting criteria that would require that a first term appear in the subtitles within a certain number of words as a second term, that a first term be spoken within a certain amount of time as a second term, that a first term be spoken by a same actor, actress, or character as a second term, or similar constraints.

A content distribution system may further include a mechanism by which users may subscribe to certain searches and receive notifications when the content distribution system publishes new content items that match the searches to channel(s) associated with the user. For instance, a user may subscribe to a search for "Olympics," and receive an email, text, or other notification any time a new content item has been published whose subtitles include the word "Olympics." The notification may include a link to the actual matching content item(s).

In an embodiment, to support such search functionality, a content distribution includes an indexing subsystem, such as subsystem 216. The indexing subsystem may index some or all of the subtitles that have been received by the content distribution system—either before or after publishing the content item, depending on the embodiment and/or the priority level. Any suitable indexing technique may be utilized, though in general the indexing involves associating each term (i.e. distinct word or phrase) that appears within a subtitle with the content item identifier of the subtitle. In some embodiments, the indexing may also record one or more of: how many times a term appears for a given subtitle track, the language of the subtitle track, and/or a timestamp or portion identifier for each occurrence of the term for a content item.

Additionally, the content distribution subsystem includes a search server that receives queries comprising search terms in various forms, searches a data repository comprising the indexed terms for associated content items whose subtitles include the search terms, and returns results with information from the matching content items. The search server may further include a mechanism for ranking search results by any of a variety of factors (e.g. number of times the corresponding content item has been viewed, number of times the corresponding content item has been requested when a user searched for the same search terms, number of times the search terms appear in the content item, etc.). Moreover, the content distribution system may provide one or more search interfaces published by one or more web servers and/or client applications. The search interfaces include interface controls by which users may form and send queries to the search server, as well as display mechanisms for results returned from the search server.

Such search interfaces may be integrated into the content distribution system's websites and client applications (e.g. as a search box that appears on some or all pages of a content distribution system website), and/or provided as a separate interface to which a user may navigate (e.g. using a menu within a content distribution system website or client application). A search interface may include a frame or other type of subsection in which the content item corresponding to a selected result may be viewed, or the selection of a result may launch playback of the content item in a different window, application, or screen.

The results returned for a subtitle search may vary depending on the embodiment. In an embodiment, the results may simply include a list of content item identifiers. In another embodiment, the results may include a series of listings, each comprising some or all of: a content item title, thumbnail, link by which viewing of the content item may be requested, short excerpt of dialogue surrounding the search terms, content preview, name of a character whose dialogue includes the term, and so forth.

In an embodiment, the timestamp of each term is also indexed. The search results may thus include a separate entry for each occurrence of the term within a content item. In an embodiment, each entry further includes or references a separate thumbnail depicting the video contents of the content item at the time at which the term was spoken, or at least a thumbnail taken from a timestamp within the content item that is closest to the timestamp associated with the entry.

In an embodiment, each entry may include a selectable control (e.g. link, play button, etc.) that causes the client to begin playback of the content item at a timestamp determined based on the timestamp associated with that entry. The playback may occur, for example, directly within the search results (e.g. replacing the main thumbnail for the entry), or within a separate frame, window, or application. If playback is already occurring, playback may be skipped to the corresponding timestamp. Depending on the embodiment and/or user preferences, the timestamp at which playback begins when the control is selected may or may not be the exact timestamp at which the search term is spoken. For example, to provide some context, or to accommodate technical requirements, playback may begin a predefined amount of time before the timestamp at which the term was spoken (e.g. 5 seconds, 15 seconds, etc.), or at a closest predefined boundary marker within the content item (e.g. the start of a scene, chapter, or chunk in which the term is mentioned, the nearest key frame, etc.).

In an embodiment where timestamps are indexed, each occurrence of the term within a content item is listed and ranked separately within results for a query, thus meaning that the search results may include multiple entries corresponding to different timestamps for the same content item. In an embodiment, the initial search results may include a listing for each content item that matches a query, and each listing may include a mechanism by which the user may request to view each unique occurrence of the search terms. The mechanism may expand the listing to show each entry for each occurrence of the term within the content item, or selection of the mechanism may open a separate window in which each entry is displayed (potentially also including a frame or other subsection in which the content item is played).

Figure 4:
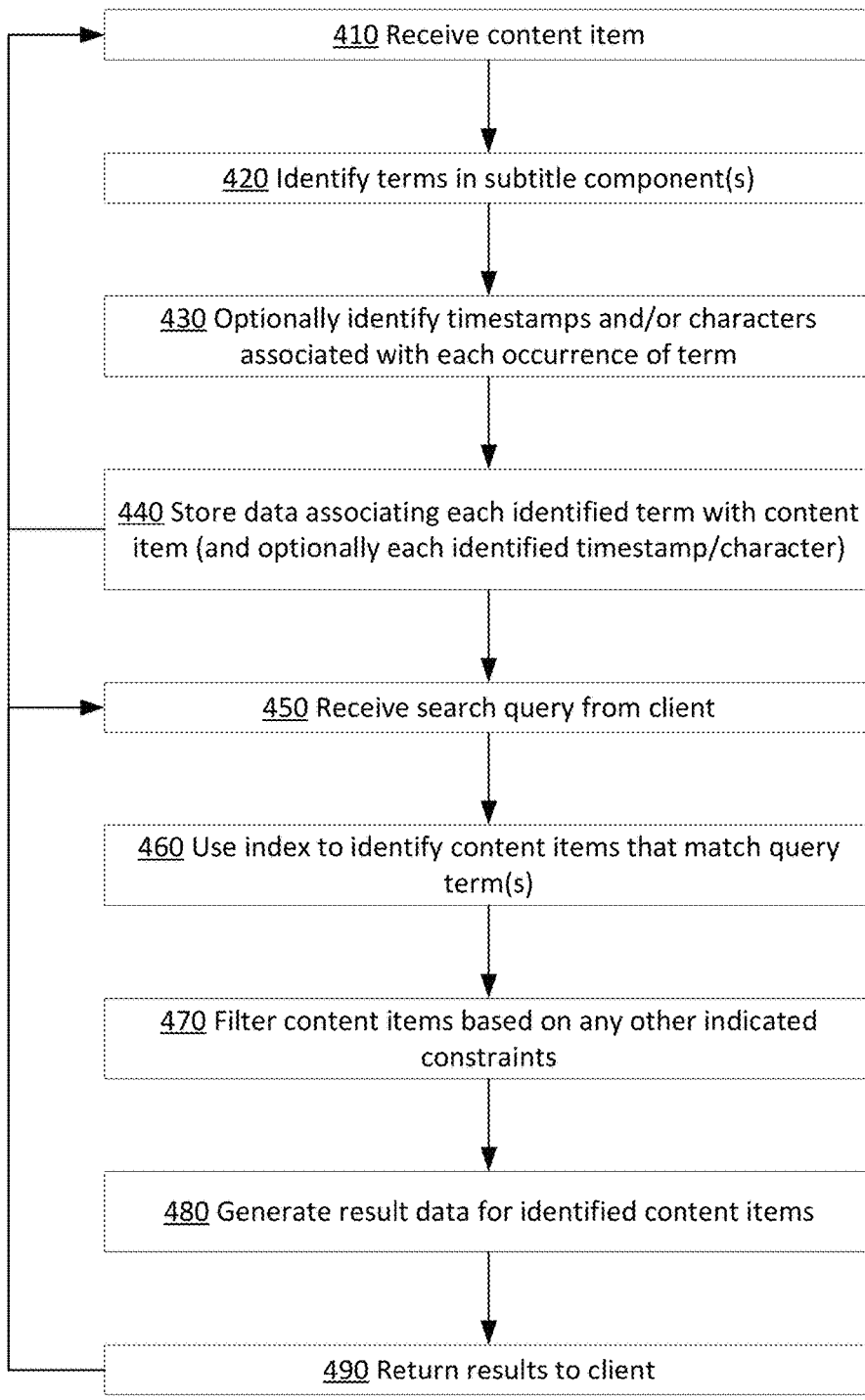
FIG. 4 illustrates an example flow 400 for indexing and searching the content within a content distribution system based on subtitles.

FIG. 4 illustrates an example flow 400 for indexing and searching the content within a content distribution system based on subtitles, according to an embodiment. The various elements of flow 400 may be performed in a variety of content distribution systems, including systems such as system 250 described above.

Block 410 comprises receiving a content item that includes subtitles. The components of the content item may be received via separate downloads, uploads, or other processes over time, such as through the process illustrated by flows 100 and/or 300, or the components of the content item may be received at once (e.g. embedded in the same file).

Block 420 comprises identifying terms in the subtitle component(s) of the content item for indexing. Any suitable parsing mechanism may be utilized to identify the terms. Not all terms appearing in the subtitles need be indexed. For example, common words such as "a" and "the" may be ignored. Any suitable indexing technique may be utilized to determine what terms should be indexed.

Block 430 comprises, optionally, identifying timestamps and/or characters associated with each occurrence of each identified term. Timestamps are typically identifiable or capable of being calculated based on information within the files or tracks that store the subtitles. The timestamps may not necessarily exactly correspond to when the term appears in the content item, depending on the quality of the subtitle. The characters who spoke a term may also be identified in certain types of subtitles. In some embodiments, characters may instead be identified by applying facial recognition algorithms to the video at the associated timestamp. If an actor or actress can be identified as speaking the term at that timestamp, metadata mapping characters to actors or actresses may be consulted to determine the corresponding character.

Block 440 comprises storing data that associates each identified term with the content item, and optionally each identified timestamp or character. The data may, for example, take the form of a record in an index table that associates the term with the content item identifier, or multiple records that associates an occurrence of the term with the content item's identifier and the term's corresponding timestamp. However, the data may take any suitable form. Where other content items have already been indexed, the data is stored with the indexed data for other content items as well (e.g. in the same index table), thus creating an index of terms across multiple content items.

Collectively, blocks 420-440 constitute the indexing process for the subtitles. In the event that subtitle components may be received at different times (e.g. as a result of translation processes), the indexing of blocks 420-440 may be performed each time a new subtitle component is received. Or, indexing may be delayed until all expected subtitles are received. Of course, blocks 410-440 may also be repeated for any number of content items.

Block 450 comprises receiving a search query from a client device. The query may include one or more terms. In some embodiments, the query may further indicate that these terms are intended to be searched for in subtitles (as opposed to metadata fields). In other embodiments, the terms may be searched for in both subtitles and metadata fields. In an embodiment, the search query may include other parameters as well.

Block 460 comprises using at least the data stored in block 440 to identify one or more content items that match search query term(s). For example, if the query is a term that was identified while performing block 420 with respect to a first content item, then in block 460, using the stored index data, the first content item may be identified as matching the query. Optionally, one or more separate metadata indexes may be consulted to identify one or more content items having metadata that match the query term(s).

Block 470 comprises filtering the content items based on any other indicated constraints. Such constraints may be identified by other search parameters (e.g. required metadata) and/or by information associated with a user account with respect to which the query is being performed (e.g. required language or content channel). Of course, the exact sequence of identifying matches and filtering in blocks 460-470 may vary depending on the embodiment and search optimization techniques.

Block 480 comprises generating result data for the identified content items. Generally, the result data comprises one or more pieces of information for each identified content item, or at least a group of highest ranked identified content items. Example result data is described above. Block 480 may further involve ranking the content items using ranking techniques such as described above.

Block 490 comprises returning the results to the client that issued the search query. The client may then request specific items of content identified in the results.

Flow 400 is but one example of a flow for indexing and searching subtitles using the described systems and techniques. Other flows may include fewer or additional steps, in varying orders.

Note that subtitle indexing and searching may be utilized in a variety of content distribution systems, even those that lack other features described herein. For instance, a subtitle indexing system need only include one or more repositories in which videos and/or audio segments are stored in association with their respective subtitles, an indexing subsystem, a search subsystem, and optionally at least one search interface. Other subsystems and components utilized for other features described herein may therefore be omitted in some embodiments, though it will be appreciated that additional advantages arise when subtitle indexing and searching is integrated with the other features described herein.

5.0. Example Embodiments

Examples of some embodiments are represented, without limitation, in the following numbered clauses:

According to an embodiment, a system comprises: an ingestion subsystem configured to receive content item components for different content items over time, the content item components including at least video components, audio components, and metadata components, the ingestion subsystem further configured to correlate the content item components by content item identifiers, each of the different content items having a different content item identifier, at least some of the content item components for a given content item being received at different times; a quality control subsystem configured to execute one or more quality control processes with respect to the content items and determine, based on the one or more quality control processes, when particular content items of the content items are in a publishable state for one or more content distribution channels; a distribution subsystem configured to generate listings of the particular content items that are in the publishable state with respect to the one or more content distribution channels, send the listings to client devices, and send at least some components of a specific content item described in the listings to a requesting client device that requests the specific content item.

In an embodiment, the quality control subsystem is configured to utilize different publishing rules to determine when a first content item is in the publishable state with respect to different channels of the content distribution channels, the listings generated by the distribution subsystem at a certain time describing the first content item as available via a first channel but not available via a second channel.

In an embodiment, the quality control processes include ensuring that individual content item components meet formatting requirements for the one or more content distribution channels.

In an embodiment, the quality control processes include generating additional content item components for a first content item, wherein the additional content item components include one or more of: a thumbnail, translated audio component, transcoded video component, transcribed subtitle, translated subtitle, or additional metadata.

In an embodiment, the quality control subsystem is configured to continue generating additional content item components for a first content item after the first content item has already been described by the distribution subsystem in a first listing published to a first channel.

In an embodiment, the ingestion subsystem is configured to continue to receive additional content item components for a first content item after the first content item has already been described by the distribution subsystem in a first listing published to a first channel.

In an embodiment, the quality control subsystem is configured to determine that a first content item is in the publishable state when the one or more quality control processes indicate that a set of required content item components have been received or generated for the first content item.

In an embodiment, the quality control subsystem is configured to determine that a first content item is in the publishable state when the one or more quality control processes indicate that at least a first thumbnail and a first required metadata field exist for the first content item.

In an embodiment, the content item components further include subtitle components, wherein the quality control subsystem is configured to determine that a first content item is in the publishable state for a first channel when a subtitle component in a first language required by the first channel has been received or generated.

In an embodiment, the quality control subsystem is configured to determine that a first content item is in the publishable state for a first channel when an audio component in a first language required by the first channel has been received or generated.

In an embodiment, the system further comprises: a transcoding subsystem configured to transcode certain video components of the content item components; wherein the quality control subsystem is configured to determine that a first content item is in the publishable state for a first channel when a transcoded video component in a first format required by the first channel has been transcoded by the transcoding subsystem.

In an embodiment, the content item components further include thumbnail images.

In an embodiment, the ingestion subsystem is configured to receive the content item components by monitoring one or more web sites or content feeds.

In an embodiment, the ingestion subsystem includes an ingestion interface configured to receive the content item components by receiving uploads of the content item components.

In an embodiment, the system further comprises: an indexing subsystem configured to generate indexes of metadata and/or subtitles of the content items; a search server configured to receive queries, determine matching content items for the queries based at least on the indexes, and respond to the queries with information about the matching content items.

In an embodiment, the system further comprises a prioritization subsystem configured to identify high priority content items and cause the high priority content items to be processed using a prioritized workflow relative to other content items.

In an embodiment, the system further comprises a reporting subsystem configured to generate reports based on logs of the quality control processes and/or logs of content item distribution events.

In an embodiment, the system further comprises a content programming interface.

In an embodiment, the one or more content distribution channels comprise different channels corresponding to one or more of: different languages, different geographic regions, or different subscription levels.

According to an embodiment, a method comprises: receiving content item components for different content items over time, the content item components including at least video components, audio components, and metadata components; correlating the content item components by content item identifiers, each of the different content items having a different content item identifier, at least some of the content item components for a given content item being received at different times; performing one or more quality control checks with respect to formatting of at least certain types of content item components; determining when particular content items of the content items are in a publishable state for one or more content distribution channels based on one or more publishing rules, the one or more publishing rules specifying particular types of content item components that are required to exist for the particular content items in order for the particular content items to be in the publishable state; publishing the particular content items to the one or more content distribution channels when the particular content items are in the publishable state for the one or more content distribution channels by sending particular content item components of the particular content items to client devices associated with the one or more content distribution channels.

In an embodiment, the method further comprises: causing one or more additional content item components to be generated for at least a first set of the content items.

In an embodiment, the method further comprises: based on the one or more publishing rules indicating that a first content item is in the publishable state with respect to a first channel, but not with respect to a second channel, publishing the first content item to first client devices associated with the first channel, but not to second client devices associated with the second channel.

In an embodiment, performing one or more quality control checks with respect to the formatting of at least certain types of content item components comprises ensuring that the video components meet one or more formatting restrictions, the formatting restrictions including restrictions on at least one of: encoding format, resolution, or bitrate.

In an embodiment, causing the one or more additional content item components to be generated comprises one or more of: transcoding first video components to generate transcoded video components in formats associated with the one or more content distribution channels, generating one or more thumbnails, or sending an instruction to a translation service.

In an embodiment, the method further comprises: receiving or generating an additional content item component for a first content item after publishing the first content item to a first channel; responsive to receiving or generating the additional content item component, performing one or more of: publishing the first content item to a second channel, or updating a listing of the first content item published to the first channel.

In an embodiment, the content item components further include subtitle components, and determining when particular content items of the content items are in a publishable state comprises determining that a first content item is in the publishable state for a first channel when a subtitle component in a first language required by the first channel has been received or generated.

In an embodiment, determining when particular content items of the content items are in a publishable state comprises determining that a first content item is in the publishable state for a first channel when an audio component in a first language required by the first channel has been received or generated.

In an embodiment, the method further comprises: transcoding certain video components of the content item components; wherein determining when particular content items of the content items are in a publishable state comprises determining that a first content item is in the publishable state for a first channel when a transcoded video component in a first format required by the first channel has been transcoded by the transcoding subsystem.

In an embodiment, the method further comprises: receiving the content item components comprises monitoring one or more web sites or content feeds for new content items and downloading the new content items.

In an embodiment, the method further comprises: generating indexes of metadata and/or subtitles of the content items; receiving queries; determining matching content items for the queries based at least on the indexes; and responding to the queries with information about the matching content items.

According to an embodiment, a method comprises: accessing content items that include subtitle components; indexing the content items using the subtitle components, the indexing comprising, for a given content item, identifying terms in one or more subtitle components that belong to the given content item and storing index data that associates each of identified terms with the given content item; receiving a search query from a requestor, the search query including at least one search term; identifying one or more matching content items for the search query by determining which of the content items is associated with the search term in the index data; generating result data comprising information about at least one matching content item of the one or more matching content items; returning the result data to the requestor.

In an embodiment, the requestor is one of a client device, a web server, or a server application.

In an embodiment, the result data includes at least a plurality of entries, each of the entries in the plurality of entries corresponding to a different content item that is associated with the search term in the index data, each of the entries in the plurality of entries including a mechanism by which playback of the corresponding content item may be requested.

In an embodiment, each of the entries in the plurality of entries further comprises a thumbnail for the content item.

In an embodiment, the search query further comprises one or more metadata filters, the method further comprising filtering the one or more matching content items based on the comparing the metadata filters to metadata fields associated with the content items.

In an embodiment, the indexing comprises recording, in the index data, time associations between timestamps, specific content items, and specific terms, the time associations associating a particular term with at least one particular timestamp in a particular content item at which the term occurs.

In an embodiment, generating the result data comprises, based on the time associations, including within the result data a mechanism for beginning playback of a first content item at a time determined based on a first timestamp that is associated with a first term and the first content item.

In an embodiment, the time corresponds to either a predetermined amount of time prior to the first timestamp, or a first marker of a certain marker type prior to the first timestamp.

In an embodiment, generating the result data comprises, based on a first timestamp in the time associations, determining a thumbnail to include within the result data for a first content item associated with the first timestamp and the search term.

In an embodiment, the method further comprises: automatically generating the thumbnail.

In an embodiment, generating the result data comprises, based on the time associations, generating a plurality of entries for a first content item within the result data, each entry of the plurality of entries for the first content item corresponding to a different timestamp associated with the first content item and the search term, each entry of the plurality of entries for the first content item including at least one of a thumbnail determined based on the corresponding timestamp or a mechanism for beginning playback of the first content item at a time determined based on the corresponding timestamp.

In an embodiment, the indexing comprises recording, in the index data, character associations between characters, specific content items, and specific terms, the character associations associating a particular term with at least one particular character in a particular content item who spoke the term; and generating the result data comprises, based on the character associations, including within the result data an indication that the first term was spoken by at least a first character in a first content item.

In an embodiment, the method further comprises: ranking the at least one matching content item.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
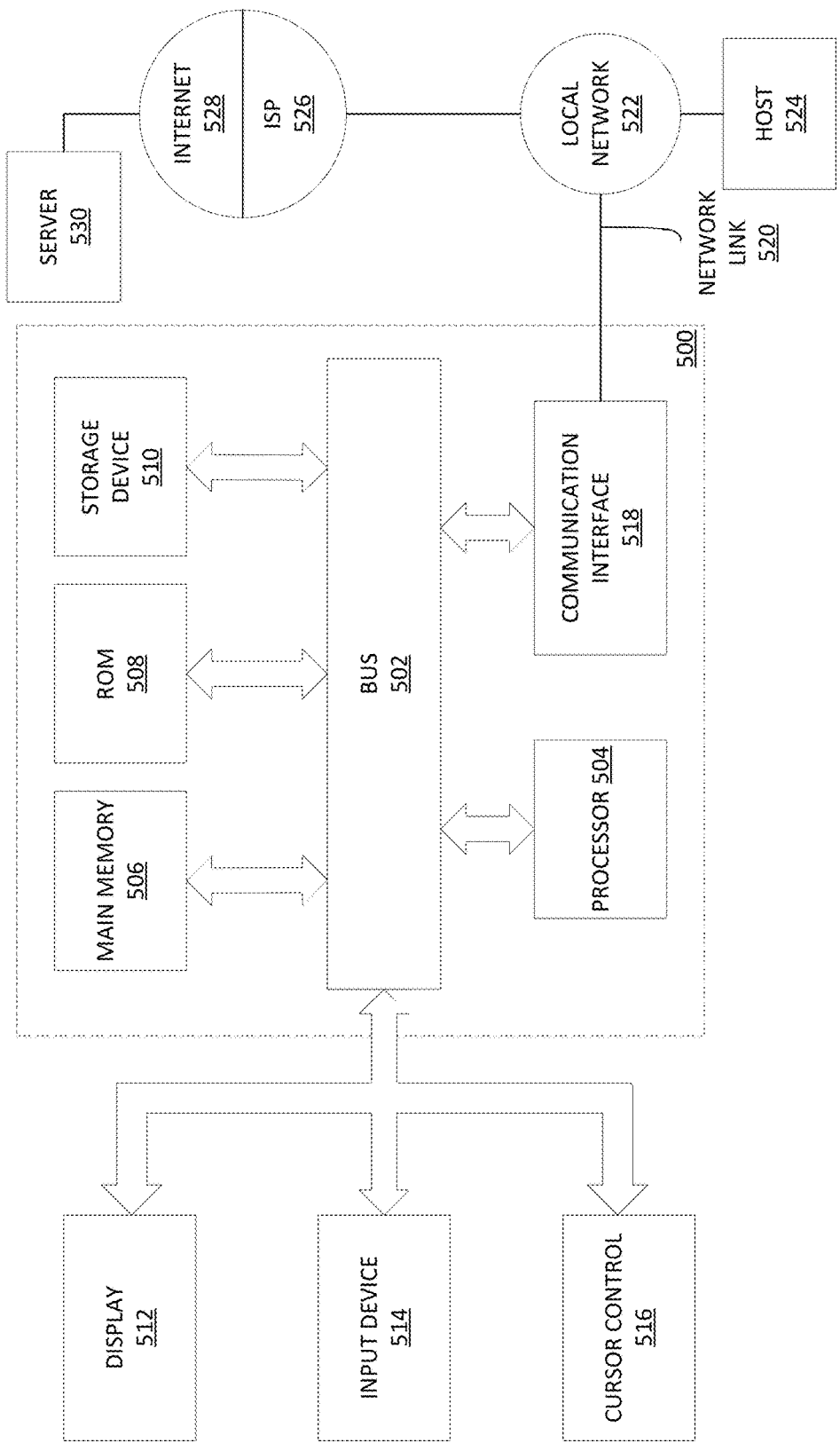
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 1112 may be accelerated by one or more graphics processing unit (GPUs) in computer system 1100. A GPU may be, for example, a highly parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance. Various other computing tasks may be off-loaded from the processor 1104 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 502.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Distributor 526. Service Distributor 526, which may for example be an Internet Service Distributor (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed by a content distribution computer system, the method comprising:
   receiving transmissions of content item components for different content items via a network over time, the content item components including at least video data components, audio data components, and metadata components, at least some of the content item components for a given content item received at different times;
   storing the content item components, correlated by content item identifiers, each of the different content items having a different content item identifier;
   performing quality control checks with respect to formatting of at least certain types of the stored content item components;
   determining when particular content items of the stored content items are publishable for different content distribution channels based on the quality control checks and on publishing rules that specify particular combinations of types of content item components to be stored for the particular content items;
   based on determining that the particular content items are publishable for particular content distribution channels, one or more servers publishing the particular content items by transmitting particular stored content item components that are correlated to the particular content items, including particular video data components, over one or more networks to client devices associated with the particular content distribution channels, a set of content item components transmitted to given client devices for a first content item varying depending on the particular content distribution channels through which the given client devices request the first content item;
   receiving or generating an additional content item component for the first content item after publishing the first content item to a first channel;
   responsive to receiving or generating the additional content item component, performing one or more of: publishing the first content item to a second channel to which the first content item was previously not publishable, or updating a listing of the first content item published to the first channel.

2. The method of claim 1, wherein performing one or more quality control checks with respect to the formatting of at least certain types of content item components comprises ensuring that the video data components meet one or more formatting restrictions, the formatting restrictions including restrictions on at least one of: encoding format, resolution, or bitrate.

3. The method of claim 1, further comprising, responsive to passing one or more quality checks on one or more first content item components of the first content item, generating additional content item components for the first content item from the one or more first content item components, the generating comprising one or more of: transcoding a first video data components to generate a transcoded video data components in a formats associated with the second channel, generating one or more thumbnails, or generating subtitles.

4. The method of claim 1, wherein the content item components further include subtitle components, wherein determining when the particular content items are publishable comprises determining that the first content item is publishable for the first channel when a subtitle component in a first language required by the first channel has been received or generated.

5. The method of claim 1, further comprising monitoring one or more web sites or content feeds for new content items, wherein receiving transmissions of the content item components includes downloading the new content items based on the monitoring.

6. The method of claim 1, further comprising:
responsive to one or more first content item components of the first content item meeting an initial quality control check, generating one or more additional content item components for the first content item based on the one or more first content item components.

7. One or more non-transitory computer-readable media storing instructions that, when executed by one or more computing devices in a content distribution computer system, cause:
receiving transmissions of content item components for different content items via a network over time, the content item components including at least video data components, audio data components, and metadata components, at least some of the content item components for a given content item received at different times;
storing the content item components, correlated by content item identifiers, each of the different content items having a different content item identifier;
performing quality control checks with respect to formatting of at least certain types of the stored content item components;
determining when particular content items of the stored content items are publishable for different content distribution channels based on the quality control checks and on publishing rules that specify particular combinations of types of content item components to be stored for the particular content items;
based on determining that the particular content items are publishable for particular content distribution channels, one or more servers publishing the particular content items by transmitting particular stored content item components that are correlated to the particular content items, including particular video data components, over one or more networks to client devices associated with the particular content distribution channels, a set of content item components transmitted to given client devices for a first content item varying depending on the particular content distribution channels through which the given client devices request the first content item;
receiving or generating an additional content item component for the first content item after publishing the first content item to a first channel;
responsive to receiving or generating the additional content item component, performing one or more of: publishing the first content item to a second channel to which the first content item was previously not publishable, or updating a listing of the first content item published to the first channel.

8. The one or more non-transitory computer-readable media of claim 7, wherein the first channel and the second channel correspond to different carriers or Internet Service Providers by which the client devices may access the content distribution computer system.

9. The one or more non-transitory computer-readable media of claim 7, wherein determining when particular content items of the stored content items are publishable comprises utilizing different publishing rules to determine when the first content item is in the publishable state with respect to different channels of the content distribution channels, the listings generated by the distribution subsystem at a certain time describing the first content item as available via the first channel but not available via the second channel.

10. The system of claim 7, further comprising:
a content programming interface configured to receive an edit to a metadata component for the first content item after the first content item has already been published;
wherein the one or more servers are configured to subsequently publish the first content item to multiple content distribution channels with the edited metadata component.

11. The one or more non-transitory computer-readable media of claim 7, wherein the first channel and the second channel correspond to different carriers or Internet Service Providers by which the client devices may access the content distribution computer system.

12. The one or more non-transitory computer-readable media of claim 11, wherein the content item components further include subtitle components, wherein determining when the particular content items are publishable comprises determining that the first content item is publishable for the first channel when a subtitle component in a first language required by the first channel has been received or generated.

13. The one or more non-transitory computer-readable media of claim 11, wherein the instructions, when executed by the one or more computing devices, further cause:
responsive to one or more first content item components of the first content item meeting an initial quality control check, generating one or more additional content item components for the first content item based on the one or more first content item components.

14. A content distribution computer system comprising:
an ingestion subsystem configured to receive transmissions of content item components for different content items via a network over time, the content item components including at least video components, audio components, and metadata components, the ingestion subsystem further configured to store the content item components correlated by content item identifiers, each of the different content items having a different content item identifier, at least some of the content item components for a given content item being received at different times;
a quality control subsystem configured to execute quality control processes with respect to the stored content item components, and further to, based on the quality control processes and on publishing rules that specify particular combinations of types of content item components to be stored for particular content items, determine when the particular content items of the content items are publishable for different content distribution channels;
a distribution subsystem configured to generate listings of the particular content items that are publishable with respect to particular content distribution channels, the distribution subsystem including one or more servers configured to publish the listings by transmitting the listings over one or more networks to client devices associated with the particular content distribution channels, and further to publish a first content item described in the listings by transmitting stored content item components correlated to the first content item to requesting client devices that request the first content item over the one or more networks, the stored content item components transmitted to a given client device varying depending on the particular content distribution channels through which the given client devices request the first content item;

wherein the ingestion subsystem is configured to continue to receive an additional content item components for the first content item after the first content item has already been described by the distribution subsystem in a first listing published to a first channel;

wherein the distribution subsystem is further configured to, based on the additional content item component, publish the first content item to a second channel to which the first content item was previously not publishable, by the one or more servers transmitting at least the additional content item component to client devices that request the first content item through the second channel.

15. The system of claim 14, wherein the quality control subsystem is configured to utilize different publishing rules to determine when the first content item is in the publishable state with respect to different channels of the content distribution channels, the listings generated by the distribution subsystem at a certain time describing the first content item as available via the first channel but not available via the second channel.

16. The system of claim 14, wherein the quality control processes include ensuring that individual content item components meet formatting requirements for the particular content distribution channels, the formatting requirements including restrictions on at least one of: encoding format, resolution, or bitrate.

17. The system of claim 14, wherein the content item components further include subtitle components, wherein the quality control subsystem is configured to determine that the first content item is publishable for the first channel when a subtitle component in a first language required by the first channel has been received or generated.

18. The system of claim 14, wherein the ingestion subsystem is configured to monitor one or more web sites or content feeds and download at least first content item components listed on the one or more web sites or content feeds.

19. The system of claim 13, further comprising:
a content programming interface configured to receive an edit to a metadata component for the first content item after the first content item has already been published;
wherein the one or more servers are configured to subsequently publish the first content item to multiple content distribution channels with the edited metadata component.

20. The system of claim 14, wherein the first channel and the second channel correspond to different carriers or Internet Service Providers by which the client devices may access the content distribution computer system.

21. The system of claim 20, wherein the first channel and the second channel correspond to different carriers or Internet Service Providers by which the client devices may access the content distribution computer system.

22. A content distribution computer system comprising:
an ingestion subsystem configured to receive transmissions of content item components for different content items via a network over time, the content item components including at least video components, audio components, and metadata components, the ingestion subsystem further configured to store the content item components correlated by content item identifiers, each of the different content items having a different content item identifier, at least some of the content item components for a given content item being received at different times;
a quality control subsystem configured to execute quality control processes with respect to the stored content item components, and further to, based on the quality control processes and on publishing rules that specify particular combinations of types of content item components to be stored for particular content items, determine when the particular content items of the content items are publishable for different content distribution channels;
a distribution subsystem configured to generate listings of the particular content items that are publishable with respect to particular content distribution channels, the distribution subsystem including one or more servers configured to publish the listings by transmitting the listings over one or more networks to client devices associated with the particular content distribution channels, and further to publish a first content item described in the listings by transmitting stored content item components correlated to the first content item to requesting client devices that request the first content item over the one or more networks, the stored content item components transmitted to a given client device varying depending on the particular content distribution channels through which the given client devices request the first content item;
wherein the quality control subsystem is configured to continue generating additional content item components for a first content item after the first content item has already been described by the distribution subsystem in a first listing published to a first channel;
wherein the distribution subsystem is further configured to, based on the additional content item component, publish the first content item to a second channel to which the first content item was previously not publishable, by the one or more servers transmitting at least the additional content item component to client devices that request the first content item through the second channel.

23. The system of claim 22, wherein the quality control processes include, responsive to passing one or more quality checks on one or more first content item components of the first content item, generating additional content item components for the first content item from the one or more first content item components, wherein the additional content item components include one or more of: a thumbnail, translated audio data component, transcoded video data component, transcribed subtitle, translated subtitle, or additional metadata.

24. The system of claim 22, wherein the content item components further include subtitle components, wherein the quality control subsystem is configured to determine that the first content item is publishable for the first channel when a subtitle component in a first language required by the first channel has been received or generated.

* * * * *

UNITED STATES PATENT AND TRADEMARK OFFICE
CERTIFICATE OF CORRECTION

PATENT NO. : 10,264,314 B2
APPLICATION NO. : 15/143325
DATED : April 16, 2019
INVENTOR(S) : Ding et al.

Page 1 of 1

It is certified that error appears in the above-identified patent and that said Letters Patent is hereby corrected as shown below:

In the Claims

Column 36
Claim 3: Line 67: Delete "components" and insert --component--

Column 37
Claim 3: Line 1: Delete "components" and insert --component--
Claim 3: Line 1: Delete "formats" and insert --format--

Column 38
Claim 11: Line 22: Delete "The one or more non-transitory computer-readable media of claim 7, wherein the first channel and the second channel correspond to different carriers or Internet Service Providers by which the client devices may access the content distribution computer system." and insert --The one or more non-transitory computer-readable media of claim 7, wherein the instructions, when executed by the one or more computing devices, further cause: receiving, via a content programming interface, an edit to a metadata component for the first content item after the first content item has already been published, the one or more servers subsequently publishing the first content item to multiple content distribution channels with the edited metadata component.--
Claim 12: Line 28: Delete "claim 11" and insert --claim 7--
Claim 13: Line 35: Delete "claim 11" and insert --claim 7--

Column 39
Claim 14: Line 13: Delete "components" and insert --component--

Signed and Sealed this
Fourth Day of June, 2019

Andrei Iancu
*Director of the United States Patent and Trademark Office*